(12) United States Patent
Shaked et al.

(10) Patent No.: US 11,405,257 B2
(45) Date of Patent: Aug. 2, 2022

(54) SYSTEM FOR CENTRALIZED MONITORING AND CONTROL OF IOT DEVICES

(71) Applicant: SCADAfence Ltd., Tel Aviv (IL)

(72) Inventors: Ofer Shaked, Tel-Aviv (IL); Dan Haim, Ramat-Gan (IL)

(73) Assignee: SCADAfence Ltd., Tel Aviv (IL)

( * ) Notice: Subject to any disclaimer, the term of this patent is extended or adjusted under 35 U.S.C. 154(b) by 0 days.

(21) Appl. No.: 17/321,076

(22) Filed: May 14, 2021

(65) Prior Publication Data

US 2021/0359897 A1    Nov. 18, 2021

Related U.S. Application Data

(60) Provisional application No. 63/026,470, filed on May 18, 2020.

(51) Int. Cl.
*H04L 41/0246* (2022.01)
*G16Y 30/00* (2020.01)
(Continued)

(52) U.S. Cl.
CPC .......... *H04L 41/0246* (2013.01); *G16Y 30/00* (2020.01); *H04L 12/281* (2013.01); *H04L 41/22* (2013.01); *H04L 67/12* (2013.01)

(58) Field of Classification Search
CPC ... H04L 12/2803–2838; H04L 41/0253; H04L 41/0803–0809; H04L 41/0893;
(Continued)

(56) References Cited

U.S. PATENT DOCUMENTS 6,618,764 B1 * 9/2003 Shteyn .............. H04L 12/40117
709/249
6,801,507 B1 * 10/2004 Humpleman ........... H04L 67/36
370/257
(Continued)

FOREIGN PATENT DOCUMENTS

GB          2550844 A      12/2017

OTHER PUBLICATIONS

Jin, Yucheng. "Generating Model-Based User Interfaces for IoT Devices." Jun. 2014.*
(Continued)

*Primary Examiner* — Brendan Y Higa
(74) *Attorney, Agent, or Firm* — Fiala & Weaver P.L.L.C.

(57) ABSTRACT

A system for centralized monitoring and control of Internet of Things (IoT) devices comprises an abstraction module development utility and an IoT device management system. The abstraction module development utility determines one or more device-specific user interface (UI) interactions for performing an action for each of a plurality of different IoT device types and generates an abstraction module for each of the different IoT device types. The IoT device management system is configured to generate one or more non-device-specific API calls for performing the action with respect to a particular IoT device, determine an IoT device type from among the plurality of different IoT device types for the particular IoT device, and direct the one or more non-device-specific API calls for performing the action to the abstraction module for the determined IoT device type for execution against the particular IoT device.

26 Claims, 15 Drawing Sheets

(51) Int. Cl.
*H04L 41/22* (2022.01)
*H04L 67/12* (2022.01)
*H04L 12/28* (2006.01)

(58) Field of Classification Search
CPC ....... H04L 41/22; H04L 43/045; H04L 67/12; G16Y 20/00–40; G16Y 30/00–10; G16Y 40/00–60
See application file for complete search history.

(56) References Cited

U.S. PATENT DOCUMENTS

| | | | |
|---|---|---|---|
| 6,918,123 B1 * | 7/2005 | Shteyn | H04L 12/2805 719/318 |
| 7,200,683 B1 * | 4/2007 | Wang | H04L 67/16 709/250 |
| 7,610,559 B1 * | 10/2009 | Humpleman | H04L 12/2814 715/740 |
| 8,032,833 B1 * | 10/2011 | Wang | H04L 41/18 715/764 |
| 9,647,896 B1 * | 5/2017 | Mulder | H04L 41/22 |
| 2016/0197769 A1 * | 7/2016 | Britt | H04L 41/0604 709/223 |
| 2017/0005820 A1 | 1/2017 | Zimmerman et al. | |
| 2017/0242557 A1 * | 8/2017 | Rotschield | G06F 3/0484 |
| 2017/0250834 A1 | 8/2017 | Hsiao | |
| 2019/0044826 A1 * | 2/2019 | Flores Guerra | H04L 41/22 |
| 2021/0058295 A1 * | 2/2021 | Pianigiani | G06F 9/4416 |

OTHER PUBLICATIONS

Nichols, Jeffrey, et al. "Huddle: automatically generating interfaces for systems of multiple connected appliances." Proceedings of the 19th annual ACM symposium on User interface software and technology. ACM, 2006.*

International Search Report and Written Opinion received for PCT Application No. PCT/IB2021/054176, dated Sep. 14, 2021, 10 pages.

* cited by examiner

```
Printer>sysinfo

ExampleCorp Printer

Model: EX-1111
Firmware Version: 1.3.2-20200324
Serial Number: A1397270142
MAC Address: A6:13:BC:C8:42:0D
IP Address: 192.0.2.84

Printer>
```

SYSTEM FOR CENTRALIZED MONITORING AND CONTROL OF IOT DEVICES

CROSS-REFERENCE TO RELATED APPLICATIONS

This application claims priority to U.S. Provisional Patent Application Ser. No. 63/026,470, filed on May 18, 2020, the entirety of which is incorporated by reference herein.

BACKGROUND

Countless "Internet of Things" (aka IoT) devices are connected to the Internet and organizational networks. In fact, the number of IoT devices currently connected to the Internet may outnumber the number of servers and workstations combined. An enterprise may have thousands of such devices (including, but not limited to, printers, security cameras, IP phones and punch clocks) connected to its organizational network, and many of these devices were never designed to be monitored and controlled in a centralized fashion. This presents a difficult challenge for Information Technology (IT) and security personnel, who need to keep track of each device.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A system for centralized monitoring and control of Internet of Things (IoT) devices comprises an abstraction module development utility and a IoT device management system. The abstraction module development utility determines one or more device-specific user interface (UI) interactions for performing an action for each of a plurality of different IoT device types and generates an abstraction module for each of the different IoT device types, each abstraction module being configured to execute one or more non-device-specific application programming interface (API) calls for performing the action by executing the corresponding one or more device-specific UI interactions for performing the action by the respective IoT device type. The IoT device management system is configured to generate the one or more non-device-specific API calls for performing the action with respect to a particular IoT device, determine an IoT device type from among the plurality of different IoT device types for the particular IoT device, and direct the one or more non-device-specific API calls for performing the action to the abstraction module for the determined IoT device type for execution against the particular IoT device.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the application and, together with the description, further explain the principles of the embodiments and to enable a person skilled in the relevant art(s) to make and use the embodiments.

Figure 1:
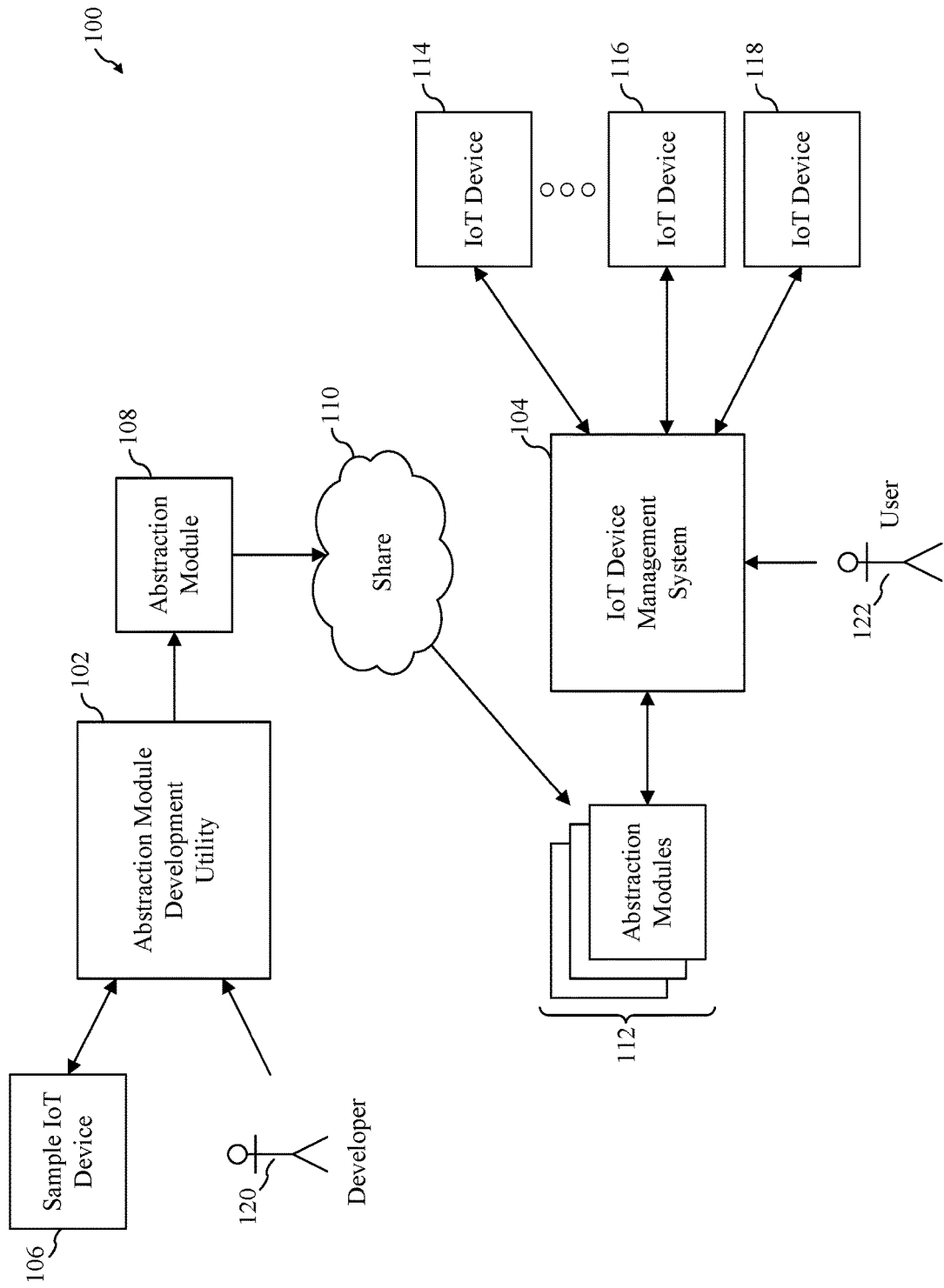
FIG. 1 is a block diagram of a system for centralized monitoring and control of IoT devices.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

The example embodiments described herein are provided for illustrative purposes and are not limiting. The examples described herein may be adapted to any type of method or system for monitoring and control of devices. Further structural and operational embodiments, including modifications/alterations, will become apparent to persons skilled in the relevant art(s) from the teachings herein.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. System Overview

As noted in the Background Section, countless IoT devices are connected to the Internet and organizational networks. In fact, the number of IoT devices currently connected to the Internet may outnumber the number of servers and workstations combined. An enterprise may have thousands of such devices (including, but not limited to, printers, security cameras, IP phones and punch clocks) connected to its organizational network, and many of these devices were never designed to be monitored and controlled in a centralized fashion. This presents a difficult challenge for IT and security personnel, who need to keep track of each device. A system will be described herein that enables the centralized monitoring and control of such devices.

All IoT devices have at least one user interface, allowing the administration of the device. These interfaces may be web (HTTP) based, command line (telnet) based, SNMP-based, based on proprietary/other protocols, or a combination of the above. An IoT device management system in accordance with an embodiment connects to these administration interfaces, emulating the user activity required to query data (such as, but not limited to, system status, firmware version, or configuration values) and perform control operations (such as, but not limited to, changing passwords, upgrading firmware, or changing configuration values) as instructed by an administrator or other user using a centralized user interface which the system presents.

FIG. 1 is a block diagram of a system 100 for centralized monitoring and control of IoT devices in accordance with an example embodiment. As shown in FIG. 1, system 100 includes an abstraction module development utility 102. Abstraction module development utility 102 is operable to train on an IoT device's human-oriented administration interface in order to learn how to retrieve and modify data via the administration interface and thereby create device-specific abstraction modules. Within this detailed description, a user using abstraction module development utility 102 to create abstraction modules may be referred to as a "developer." However, this is not intended to imply that the use of abstraction module development utility 102 requires any programming knowledge.

More specifically, abstraction module development utility 102 is configured to interact with a sample IoT device 106 to determine one or more device-specific user interface (UI) interactions for performing each of a variety of actions with respect to sample IoT device 106 and other IoT devices of a same type (e.g., same vendor, model, and/or firmware/software version) as sample IoT device 106. These actions may include, for example and without limitation, obtaining operational status information from IoT device 106, obtaining configuration information from IoT device 106, changing a configuration of IoT device 106, performing a firmware upgrade on IoT device 106, performing a password change on IoT device 106, or detecting a security weakness of IoT device 106.

As will be discussed in more detail herein, abstraction module development utility 102 may be configured to determine the device-specific UI interaction(s) for each action in an interactive manner (for example, with inputs from a developer 120), in a non-interactive manner (for example, without inputs from developer 120 or any other person) or using a combination of interactive and non-interactive techniques.

Abstraction module development utility 102 is further configured to generate an abstraction module 108 that is associated with sample IoT device 106 and other IoT devices of the same type. Abstraction module 108 comprises computer-executable code that is configured to translate between one or more non-device-specific application programming interface (API) calls for performing each of the variety of actions and the corresponding device-specific UI interaction(s) for performing those actions against sample IoT device 106 and other IoT devices of the same type. For example, abstraction module 108 may be configured to translate between a non-device-specific API call for obtaining operational status information from an IoT device and the device-specific UI interaction(s) required to obtain the operational status information from IoT device 106 and other IoT devices of the same type.

Although only a single abstraction module development utility 102 and a single sample IoT device 106 are shown in FIG. 1, any number of instances of abstraction module development utility 102 may be utilized in connection with any number of different sample IoT devices to generate a corresponding number of abstraction modules, each corresponding to a different IoT device type. For example, one or more instances of abstraction module development utility 102 may be used to generate tens, hundreds, thousands, or even tens of thousands of abstraction modules, each corresponding to a different IoT device type. These abstraction modules, denoted abstraction modules 112 in FIG. 1, may then be shared 110 with an IoT device management system 104. For example, abstraction modules 112 may be uploaded from a local storage of abstraction module development utility 102 to cloud-based storage and then downloaded from the cloud-based storage to a local storage of IoT device management system 104. Still other methods of sharing the abstraction modules available with IoT device management system 104 may be used.

IoT device management system 104 is a system that is configured to use abstraction modules 112 to communicate with a plurality of IoT devices 114, 116, 118 via their respective administration interfaces to retrieve and modify data in a centralized fashion. For the sake of illustration, only three IoT devices 114, 116, 118 are shown in communication with IoT device management system 104 in FIG. 1. However, any number of IoT devices may be in communication with IoT device management system 104 and monitored and/or controlled thereby, including tens, hundreds, thousands, or even tens of thousands of IoT devices. Within this description, a user of IoT device management system 104 (such as, but not limited to, a system administrator or IT engineer) may be referred to as simply "the user." Furthermore, the term "the user," when used in this description, refers to the user of IoT device management system 104 unless explicitly stated otherwise.

IoT device management system 104 is configured to generate one or more non-device-specific API calls for performing an action with respect to one or more IoT devices, such as IoT devices 114, 116 and 118. IoT device management system 104 may generate the non-device-specific API call(s) in response to input from a user 122. For example, user 122 may interact with a UI of IoT device management system 104 to request operational status information from a plurality of IoT devices and IoT device management system 104 may generate the non-device-specific API call(s) accordingly. IoT device management system 104 may also generate the non-device-specific API call(s) automatically (e.g., based on pre-programmed instructions to perform an action with respect to one or more IoT device(s)).

IoT device management system 104 is further configured to determine an IoT device type for each of IoT devices 114, 116, and 118. IoT device management system 104 may perform this function by interacting with each of IoT devices 114, 116 and 118 to obtain identifying information therefrom and comparing the obtained identifying information to stored identifying information for each of a plurality of different IoT device types. If the obtained identifying information for a particular IoT device matches or is otherwise sufficiently similar to the stored identifying information for a particular IoT device type, then IoT device management system 104 may conclude that the particular IoT device is of the particular IoT device type.

After IoT device management system 104 had determined the IoT device type for each of IoT devices 114, 116 and 118, it can then use the appropriate abstraction module from among the plurality of abstraction modules 112 to communicate with each of those IoT devices. In particular, IoT device management system 104 may be configured to send the non-device specific API call(s) referred to above to an appropriate one of abstraction modules 112 so that each such abstraction module can convert the non-device specific API call(s) to the appropriate device-specific UI interaction(s) required to perform the action on each of IoT devices 114, 116 and 118. In this way, IoT device management system 104 can provide a user thereof (e.g., user 122) with the ability to monitor and control any number of IoT devices through interaction with a single UI (i.e., a UI of IoT device management system 104), even though such devices are of different IoT device types and utilize completely different administration interfaces.

III. Abstraction Modules

As administration interfaces vary by vendor, model and firmware/software versions, system 100 of FIG. 1 utilizes abstraction modules that are tailored to each IoT device's specific administration interface and present a uniform API to IoT device management system 104. Each abstraction module translates between a generic language uniformly used by IoT device management system 104 and a device-specific UI "language". In one example non-limiting embodiment, the abstraction modules are the only components of IoT device management system 104 that are device-specific. In accordance with such an embodiment, in order to support a new IoT device model or vendor, a new abstraction module must be developed; however, the rest of IoT device management system 104 can remain unchanged. Due to the extremely large diversity of IoT devices, enterprises may require dozens, hundreds or even thousands of such abstraction modules to support the various installed devices.

Traditionally, the development of an abstraction layer to standardize the way a system communicates with a device requires great programming expertise, which cannot be expected from end users. Furthermore, as each IoT device type needs its own abstraction module, the programming time requirements are not sustainable on large scales. System 100 enables new IoT devices to be onboarded and supported with limited expertise and within a few minutes, without requiring any programming. This allows enterprises to rapidly support new IoT devices in a low-cost fashion and optionally create a global community of abstraction modules which may be shared (e.g., over the cloud). System 100 achieves this, at least in part, by providing abstraction module development utility 102, which includes a graphical user interface (GUI) for abstract module creation. In many implementations, writing program code is not necessary.

An abstraction module (e.g., abstraction module 108 or any of abstraction modules 112) may provide IoT device management system 104 with a consistent API allowing IoT device management system 104 to perform at least the following actions on an IoT device: (1) unique identification of the IoT device, including its vendor, exact model and firmware version; (2) log in to the IoT device using either credentials (username/password) supplied by the system or default (device-specific) credentials; (3) navigation through the administration interface of the IoT device; (4) extraction of information and configuration details from the IoT device; (5) changing the configuration of the IoT device; and (6) detection of security weaknesses which are device-unique.

IV. Definitions and Terms

Throughout this detailed description, the following definitions will apply unless stated otherwise.

IoT device management system 104 ("the system"): The monitoring and administration component, which uses existing abstraction modules in order to monitor and control IoT devices on the network. IoT device management system 104 may be implemented as software that is executed on one or more computing devices, such as the processor-based computer system discussed below in reference to FIG. 20.

Abstraction module development utility 102 ("the utility"): The component which creates new abstraction modules in order to onboard new devices. Abstraction module development utility 102 may be implemented as software that is executed on one or more computing devices, such as the processor-based computer system discussed below in reference to FIG. 20.

User: The person who uses IoT device management system 104 to monitor and control IoT devices.

Developer: The person who uses abstraction module development utility 102 in order to create abstraction modules, which may or may not be the same person as the user. It should be noted that in accordance with certain embodiments, the developer does not need to have any programming knowledge.

V. Abstraction Module Development

In an embodiment, the method of creating an abstraction module depends in part on the underlying protocol used to interact with the IoT device—Web, command line (Telnet/SSH), SNMP, and others. These will be described separately in the following sections. To create an abstraction module for a certain IoT device model, the developer will need access to the administration interface of at least one sample IoT device of said model (e.g., sample IoT device 106). This approach can be used to create abstraction modules to support any type of IoT device over any management protocol.

A. Web-Based Module Development

In an embodiment, the development of abstraction modules for web-based interfaces relies on an innovative use of browser automation frameworks. These frameworks, often used by web developers for testing purposes, are used for automation of web browser activities, automatic monitoring of the data displayed within the browser, as well as the execution of JavaScript code in the web page's context. Such browser automation frameworks can usually be used without themselves being modified in order to allow the abstraction module developer to create an abstraction module by simply interacting with a sample IoT device (e.g., sample IoT device 106) and allowing abstraction module development utility 102 to monitor the interaction and learn how to use the IoT device's administration interface therefrom.

Operations performed by abstract module development utility 102 using the framework may be divided into two categories: data position detection and form filling detection. Training in both categories can be carried out either interactively or non-interactively, with the former being more accurate and less error prone but requiring more developer input and the latter being quick and mainly automated, at the expense of slightly reduced reliability. A hybrid approach can also be used, wherein abstraction module development utility 102 attempts to detect as many details as possible using a non-interactive approach, while requesting developer interaction in order to fill in the parts that cannot be automatically detected and/or to correct any misidentifications.

1. Data Position Detection—Interactive

Interactive data position detection is used in order to extract data that IoT device management system 104 will present to the user in the system's central user interface (e.g., device status, firmware version etc.). Abstraction module development utility 102 determines where that information is displayed in the administration web interface.

There are several methods of achieving this. One method is to prompt the developer to navigate to the page displaying the requested information and copy the current value into a text box displayed in a GUI of abstraction module development utility 102. For instance, if the developer wants to detect and extract the firmware version, they will navigate to the page displaying the firmware version and then copy the current firmware version into a prompt displayed in the GUI of abstraction module development utility 102.

Another method is to prompt the developer to click on or mark the value desired to be detected. This approach may be used when the value is displayed as a control other than displayed text, such as a checkbox, radio button, edit-box, multiple-selection, or the like.

In the case of copying and/or marking methods, if the desired value has multiple entries (e.g., a user list), the developer can be prompted to copy/mark the first and the last entries. The system will then be able to use these entries as references in order to obtain other entries within the same list.

Figure 2:
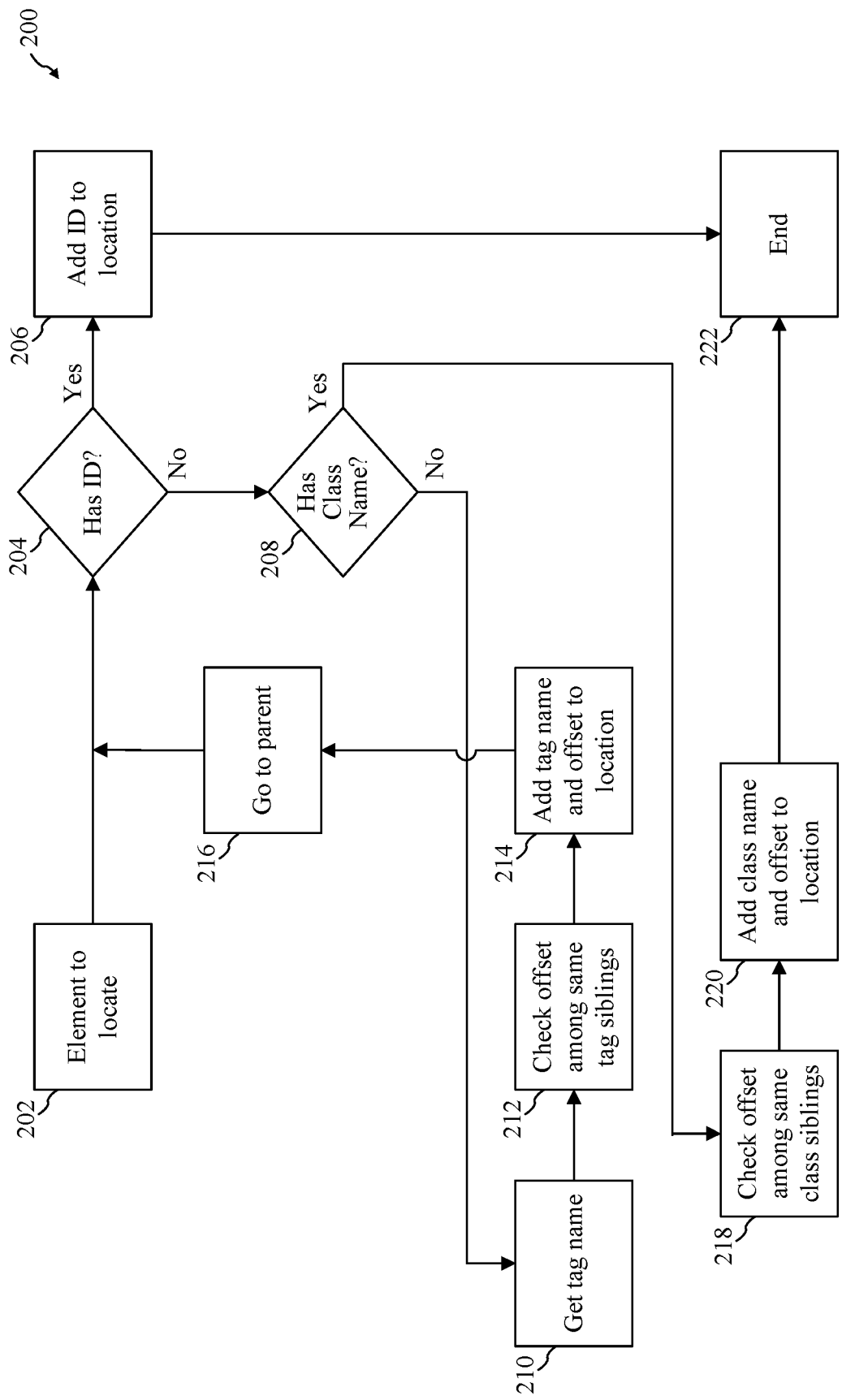
FIG. 2 depicts a flowchart of an example interactive data position detection process that may be used to develop an abstraction module for an IoT device with a web-based administration interface.

By way of further illustration, FIG. 2 depicts a flowchart 200 of an example interactive data position detection process that may be implemented by abstraction module development utility 102 to develop an abstraction module for an IoT device with a web-based administration interface.

As shown in FIG. 2, in step 202 a DOM element containing the desired value is determined. After step 202, abstraction module development utility 102 searches the HTML DOM tree for the location of the determined DOM element, which is then saved into the abstraction module. As will be discussed below, the location is determined by the element ID, class name or tag name.

In particular, after step 202, control flows to decision step 204, in which abstraction module development utility 102 determines if the DOM element has an id attribute (which is unique according to the HTML standard). If the DOM element has an id attribute, then abstraction module development utility 102 will only need to save its ID. This is reflected in step 206, in which the ID is added to the location for the DOM element that is saved into the abstraction module, after which the data position detection process ends at step 222.

However, if the DOM element does not have an id attribute, then control flows from decision step 204 to decision step 208, in which abstraction module development utility 102 determines if the DOM element has a class attribute. If so, abstraction module development utility 102 will determine the class name. If there is more than one element with the same class name, abstraction module development utility 102 will also determine the position of the DOM element in the array returned by the getElementsByClassName call, as reflected by step 218. At step 220, the class name and the offset among the same class siblings are added to the location for the DOM element that is saved into the abstraction module, after which the data position detection process ends at step 222.

If the DOM element has neither an id nor a class attribute, then control flows from decision step 208 to step 210, in which abstraction module development utility 102 obtains the tag name of the DOM element, and then to step 212, in which it obtains the position of the DOM element relative to direct siblings with the same tag name. Abstraction module development utility 102 then proceeds to check the parent element of the DOM element according to the same logic as shown by step 216 until a DOM element containing an id or a class is encountered, or the HTML tree root is reached. The entire path is then saved into the abstraction module. The path component of the URL is obtained from the browser and saved into the abstraction module as well.

When IoT device management system 104 later uses the abstraction module to extract the information, it requests the URL given in the abstraction module and then travels along the DOM tree to the saved location. This allows IoT device management system 104 to extract the needed information even if the value has changed. In the case of multiple entries, by checking the difference between the location of the first and the last entry, abstraction module development utility 102 can generate a general location, containing placeholders for integers, so that IoT device management system 104 can refer to each entry separately.

The GUI of abstraction module development utility 102 may further enable the developer to specify "weak values" for each configuration option of the IoT device. "Weak values" are values that have the potential to weaken the IoT device's security and are therefore not recommended unless the administrator has a specific need for them. These will later be used by IoT device management system 104 to notify the user of potential exposures (see "Exposures" section).

2. Data Position Detection—Non-Interactive

Abstraction module development utility 102 can attempt to automatically detect the position of relevant data using nearby text titles as hints. For instance, text saying "Firmware Version" can be assumed to be followed by the IoT device firmware version. In an embodiment, abstraction module development utility 102 contains several predetermined text titles to search including, for example and without limitation, status, firmware version, software version, and/or model.

If the page contains such text, followed immediately by other text, then the other text is assumed to be the value to be extracted. Otherwise, abstraction module development utility 102 walks up the HTML DOM tree and attempts to recognize common structures. The most common structure is a table. If abstraction module development utility 102 recognizes a td (table cell) tag containing no text other than the found title, it walks up until the parent tr (table row) tag. The desired value is assumed to be in the same table row, specifically in a table cell on the right of the text. Therefore, abstraction module development utility 102 then inspects all other td elements under the same tr element, starting from the element which contains the title text. The first cell encountered which contains text is assumed to be the value to be extracted.

Other methods of identifying details may be used by abstraction module development utility 102. For example, the web page title may include the device vendor and model. As another example, if the page contains the name of a known vendor, then the text following it can be assumed to be the model.

Abstraction module development utility 102 may cross-reference the results of various detection methods to increase the detection accuracy. Furthermore, to avoid misidentifications, abstraction module development utility 102 can also work in semi-interactive mode, where the extracted value is displayed to the developer, who confirms the correctness of the extracted value. If it is incorrect, the developer has the ability to switch to interactive mode for that value and switch back to non-interactive as needed.

After the DOM element containing the value to extract has been identified, abstraction module development utility 102 proceeds to detect its location in the same manner described above in reference to flowchart 200 of FIG. 2.

3. Error Detection and Handling

Some IoT devices build HTML pages dynamically, in which case class names and IDs may be randomly generated. An issue may also arise if two IoT device models from the same vendor present roughly the same administration interface albeit with subtle differences. This may result in the wrong value being extracted when the created abstraction module is used by IoT device management system 104. Abstraction module development utility 102 may attempt to avoid such obstacles using one or more methods described below.

One method entails enumerating element IDs and/or class names in the page, checking for similarity (e.g., IDs that differ only by digits) as well as IDs/classes whose names hint about being auto-generated (e.g., the name contains "auto", "gen" etc.). Names that appear to be auto-generated are not used when the HTML DOM location is built. It is important to note that HTML DOM locations as saved in abstraction modules are not injective, i.e., it is possible to describe the location of the same DOM element in more than one way, therefore this is possible.

Another method entails reloading the page several times and comparing the HTML DOM between them. DOM elements which have changed in any form are not used when building the HTML DOM location.

Yet another method entails developing an abstraction module using two sample IoT devices. If the developer has access to two IoT devices from the same vendor with similar interfaces, the same type of value can be extracted from both. If the interfaces are indeed similar, the utility can analyze the differences and build an HTML DOM location which is common to both.

Still another method entails performing forward error correction by value format. Abstraction module development utility 102 can make an educated guess regarding the format of the value. For instance, the firmware version of a specific IoT device may be determined to be four numeric values separated by dots, with the last one representing a date. Abstraction module development utility 102 creates a regular expression of the guessed format and saves it into the abstraction module. IoT device management system 104 which uses the abstraction module can use this regular expression to validate the correctness of the extracted value and if incorrect may also be able to find the correct value.

A further method entails performing forward error correction by title. If abstraction module development utility 102 determines that the value is located in a known common HTML DOM structure (e.g., a table) it can use the same method described above in the "Non-Interactive" section backwards to determine a title text associated with the value (if no such common structure is found, the title can also be provided interactively by the developer). The title as well as its location are saved into the abstraction module and can be used by IoT device management system 104 to validate the extracted value and/or find the new location if changed.

4. Button Clicking

In some cases, it may be necessary to interact with the web page before the desired information is displayed. In such cases, abstraction module development utility 102 can determine which sequence of buttons need to be clicked after the page is loaded.

If the underlying web-testing framework does not support element hook callbacks, a workaround approach may be used. When the module developer signals that click detection is needed, abstraction module development utility 102 injects a script into the web page, which creates an invisible DOM element with a known id and adds a context-menu event handler to all other leaf elements in the page (note: an element's context-menu handler is called when the developer right-clicks the element). When an element's handler is called, it sets the content of the newly created invisible DOM element to point at the element that the developer just clicked. By periodically reading the value of the invisible element, abstraction module development utility 102 can determine which element was clicked by the developer. Abstraction module development utility 102 prompts the developer to right-click each needed element before interacting with it (i.e., left-click) and registers the sequence, which is saved into the module.

5. Form Filling

IoT device management system 104 will need to submit web forms in order to log in to IoT devices that use forms for authentication as well as to perform certain operations, such as password changes. Abstraction module development utility 102 determines which text fields represent which values in the form. To do this, abstraction module development utility 102 prompts the developer to fill in specific values given by abstraction module development utility 102 into associated text fields in the web form. For instance, the developer may be asked to write "user123" into the username field and "pass123" into the password field. Abstraction module development utility 102 then inspects all text fields in the page, looking for said values and saves the location of those fields into the abstraction module (see the data position section above for how the location is determined).

The button clicking detection method is used to determine which button submits the form, as well as detection of non-text fields, such as checkboxes and drop-down lists.

6. Device Identification

As IoT device management system 104 scans the network for recognized IoT devices (see "System Usage" below) it needs to match each detected IoT device to its appropriate abstraction module. For web-based interfaces, IoT device management system 104 fetches the main page of the administration interfaces ("GET/") and passes the content to each abstraction module to find a match. In order to enable this, abstraction module development utility 102 automatically stores the main page or parts of it when a new abstraction module is created (the data is saved into the abstraction module). This may be handled in a manner that is transparent to the developer. If only partial data is saved, then data which is likely to remain consistent (such as page footer) is used.

A fuzzy hash of the entire page can also be saved, which can be used for advanced device identification. When this method is used, IoT device management system performs 104 the fuzzy hash function on the entire page of the scanned IoT device and compares it to the hash embedded in all registered modules. The abstraction module whose hash is most similar to the device is chosen.

7. Module Creation Workflow—Web-Based

An example workflow for creating an abstraction module for an IoT device whose administration interface is web-based will now be described. In particular, FIG. 3 depicts a flowchart 300 of a first portion of a workflow for developing an abstraction module for an IoT device whose administration interface is web-based, wherein the first portion of the workflow includes login training.

Figure 3:
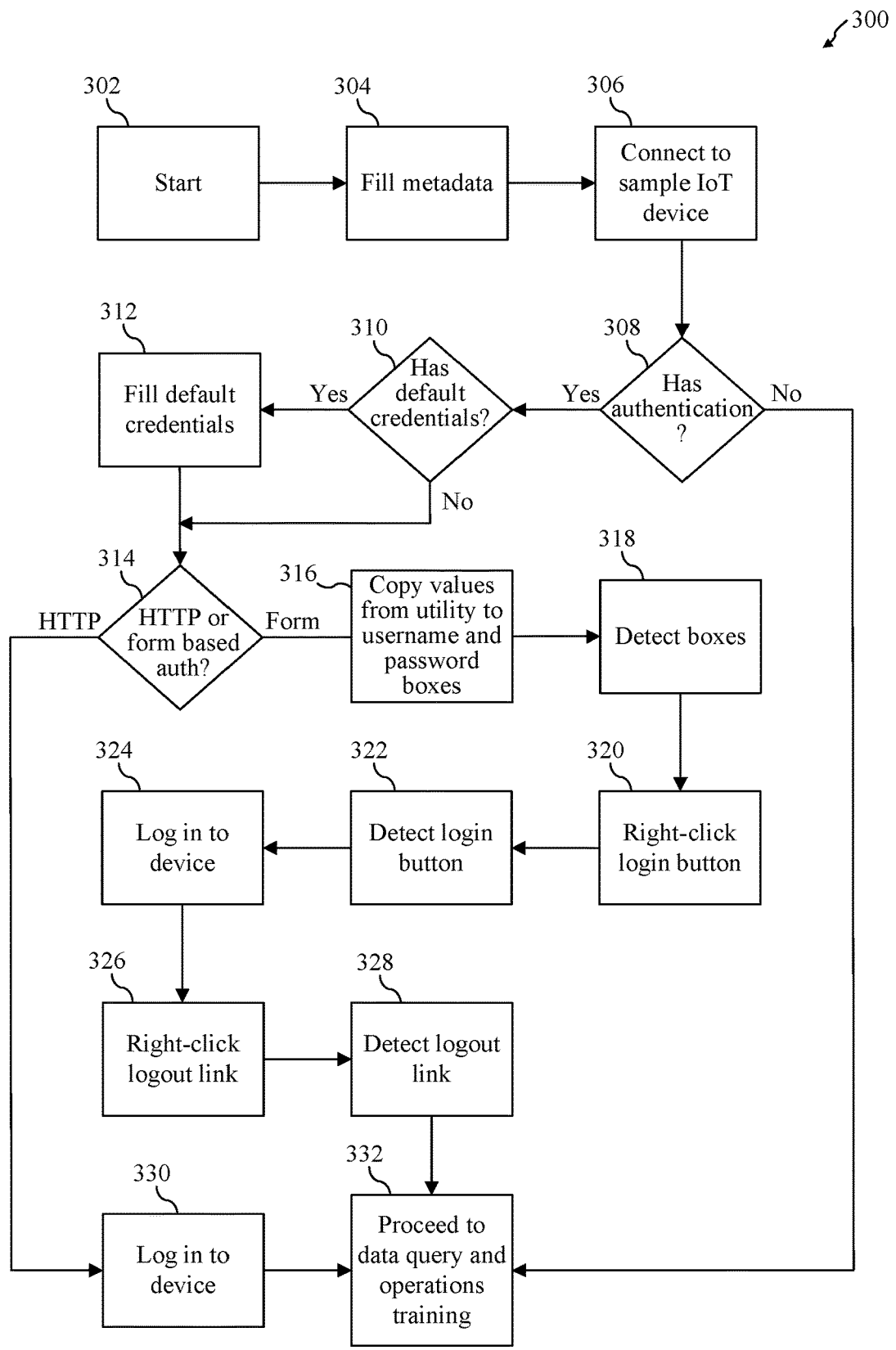
FIG. 3 depicts a flowchart of a first portion of a workflow for developing an abstraction module for an IoT device with a web-based administration interface, wherein the first portion of the workflow includes login training.

As shown in FIG. 3, the process of flowchart 300 starts at step 302 after which control flows to step 304. At step 304, the developer (e.g., responsive to prompting by abstraction module development utility 102) inputs basic metadata about the relevant IoT device (e.g., the device model and vendor), after which control flows to step 306.

At step 306, a connection to a sample IoT device is established. For example, the developer (e.g., responsive to prompting by abstraction module development utility 102) may enter an IP address of an existing IoT device of said model and vendor. Abstraction module development utility 102 then launches a monitored browser window and uses the IP address to point it to the administration interface of the IoT device. All interaction with the IoT device may be made through this browser instance.

After step 306, control flows to decision step 308 in which abstraction module development utility determines whether the IoT device requires authentication (i.e., log in). If the IoT device does not require authentication, then control flows to step 332, wherein the workflow proceeds to data query and operations training, each of which will be discussed below.

However, if the IoT device does require authentication, then the developer enters a "log in" section in abstraction module development utility 102 and control flows to decision step 310. At decision step 310, it is determined whether the IoT device has default credentials. If the IoT device does not have default credentials, then control flows to decision step 314. However, if the IoT device does have default credentials, the developer (e.g., responsive to prompting by abstraction module development utility 102) will provide those as shown at step 312 (these can usually be found in the product user manual), after which control flows to decision step 314. The default credentials are used for IoT devices whose credentials are unknown to IoT device management system 104, as well as for alerting the user thereof about IoT devices which still use those credentials and are therefore susceptible to unauthorized access.

At decision step 314, the developer selects whether the authentication is HTTP based or uses web forms. If the IoT device uses HTTP-based authentication then there is nothing left to do regarding the log in process, as HTTP authentication is standard. In this case, log in to the IoT device is performed using HTTP-based authentication as shown at step 330 and then control flows to step 332, wherein the workflow proceeds to data query and operations training, each of which will be discussed below.

However, if the IoT device uses web-form authentication, abstraction module development utility 102 will prompt the developer to enter specific values into the username and password fields as shown at step 316 and detect those fields based on such values as shown at step 318 (see "Form Filling" above). Abstraction module development utility 102 will also prompt the developer to right-click the login button as shown at step 320 and use that right-click detect the login button as shown at step 322 (see "Button Clicking" above). In this manner, abstraction module development utility 102 learns the location of the DOM elements needed for the login process. The developer can then enter the correct login credentials and log in to the device as shown at step 324. Note: If there is a login link that needs to be clicked before the login dialog is presented, abstraction module development utility 102 can learn it as well using the "Button Clicking" method.

After logging in, the developer also provides the logout link. In accordance with the process of flowchart 300, this is accomplished by the developer (e.g., responsive to prompting by abstraction module development utility 102) right-clicking the logout link as shown at step 326 and then detecting the logout link based on the right-click as shown in step 328. The logout link is used by IoT device management system 104 to verify whether the login has been successful when it attempts to log in to such IoT devices. While the use of the logout link is recommended, other elements can be used as well as long as they are guaranteed to only exist when the user of the administration interface has successfully logged in.

After step 328, control flows to step 332, wherein the workflow proceeds to data query and operations training, each of which will be discussed below.

In an embodiment, after the portion of the workflow depicted in flowchart 300 of FIG. 3 is complete, abstraction module development utility 102 presents an interface via which the developer can perform data query training and operations training.

Data query training is used to develop the portion of the abstraction module that will enable IoT device management system 102 to pull various data from the IoT device configuration, such as status, firmware version, and various configuration values. To add a new value to the values being queried, the developer enters the name of the value (e.g., "Firmware Version") and proceeds according to the "Data Position Detection" section above. If certain configuration values are represented in a non-textual manner (e.g., a checkbox being checked or not) then the "Button Clicking" method is used to determine the element to inspect.

Figure 4:
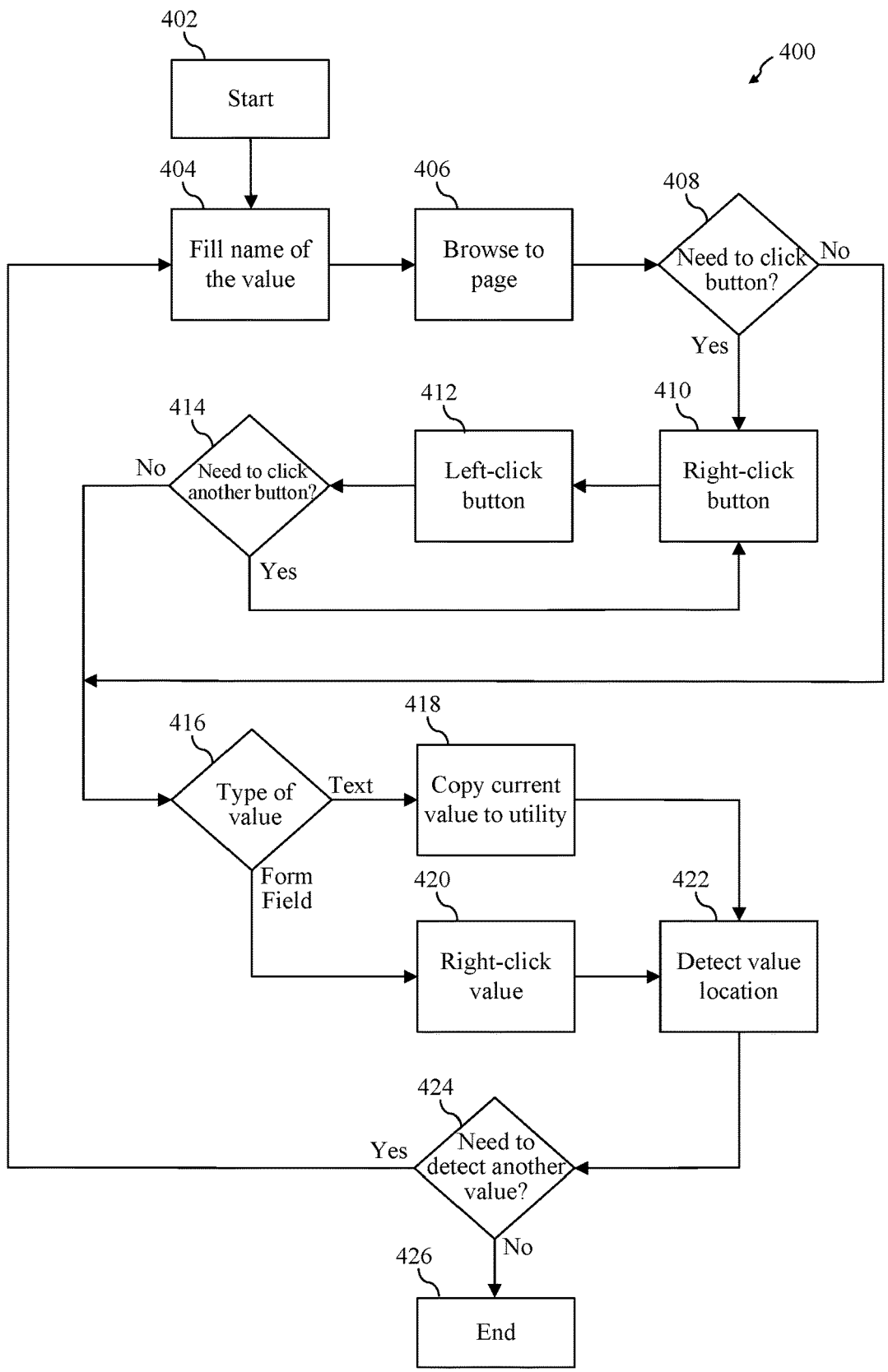
FIG. 4 depicts a flowchart of an example data query training process for developing an abstraction module for an IoT device with a web-based administration interface.

By way of further illustration, FIG. 4 depicts a flowchart 400 of an example data query training process for an IoT device having a web-based administration interface that may be implemented by abstraction module development utility 102.

As shown in FIG. 4, the data query training process starts at step 402 after which control immediately flows to step 404. At step 404, the developer (e.g., responsive to prompting by abstraction module development utility 102) fills in the name of the value to be queried, after which control flows to step 406. At step 406, the developer browses to the page on which the value is located, after which control flows to decision step 408. At decision step 408, it is determined whether a button must be clicked to access the value. If a button need not be clicked, control flows to decision step 416. However, if a button must be clicked, then (e.g., responsive to prompting by abstraction module development utility 102) the developer right-clicks the button as shown at step 410 to enable detection of the button, and then left-clicks the button to activate it as shown at step 412. Control then flows to decision step 414 to determine whether another button must be clicked to access the value. If so, the process is repeated (as shown by control returning to step 410); otherwise, control flows to decision step 416.

At decision step 416, it is determined whether the value is a text value or form field value. If the value is a text value, then the developer (e.g., responsive to prompting by abstraction module development utility 102) copies the current value to abstraction module development utility 102 as shown at step 418 and abstraction module development utility 102 detects the value location accordingly as shown at step 422. However, if the value is a form field value, then the developer (e.g., responsive to prompting by abstraction module development utility 102) right-clicks on the value as shown at step 420 and abstraction module development utility 102 detects the value location accordingly as shown at step 422.

After step 422, control flows to decision step 424 to determine whether another value to be queried needs to be detected. If so, control returns to step 404. If not, the process ends at step 426.

Operations training is used to develop the portion of the abstraction module that will enable IoT device management system 104 to perform active operations, such as password changes, firmware updates and reboots. As these changes are almost always done using web forms, the "Form Filling" method is used. For password changes, the developer is asked to identify the "old password", "new password" and "verify password" fields, as well as the form submission button. For firmware upgrades, the developer is asked to identify the "upload" button and the form submission button. For configuration changes, the developer is asked to identify the relevant configuration field and the form submission button.

For certain IoT devices, there is no need to use operations training for configuration changes, as the data gathered during data query training is mostly or entirely sufficient. When the developer adds a new value during data query training, they will choose whether that value is mutable or not. If the value is mutable, the developer will be prompted to identify the "save" button of the configuration page (this is done via the "Button Clicking" detection method). The combination of the data position and the location of the save button allows IoT device management system 104 to modify said configuration value.

Figure 5:
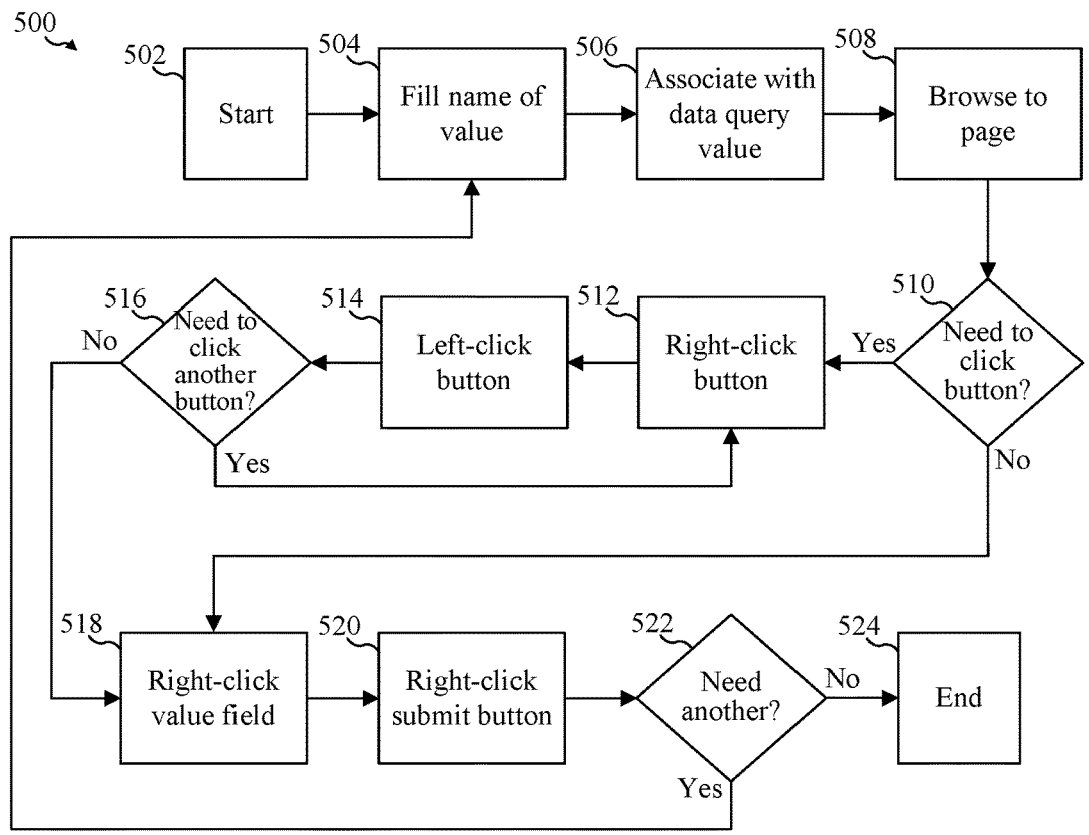
FIG. 5 depicts a flowchart of an example configuration change training process for developing an abstraction module for an IoT device with a web-based administration interface.
Figure 6:
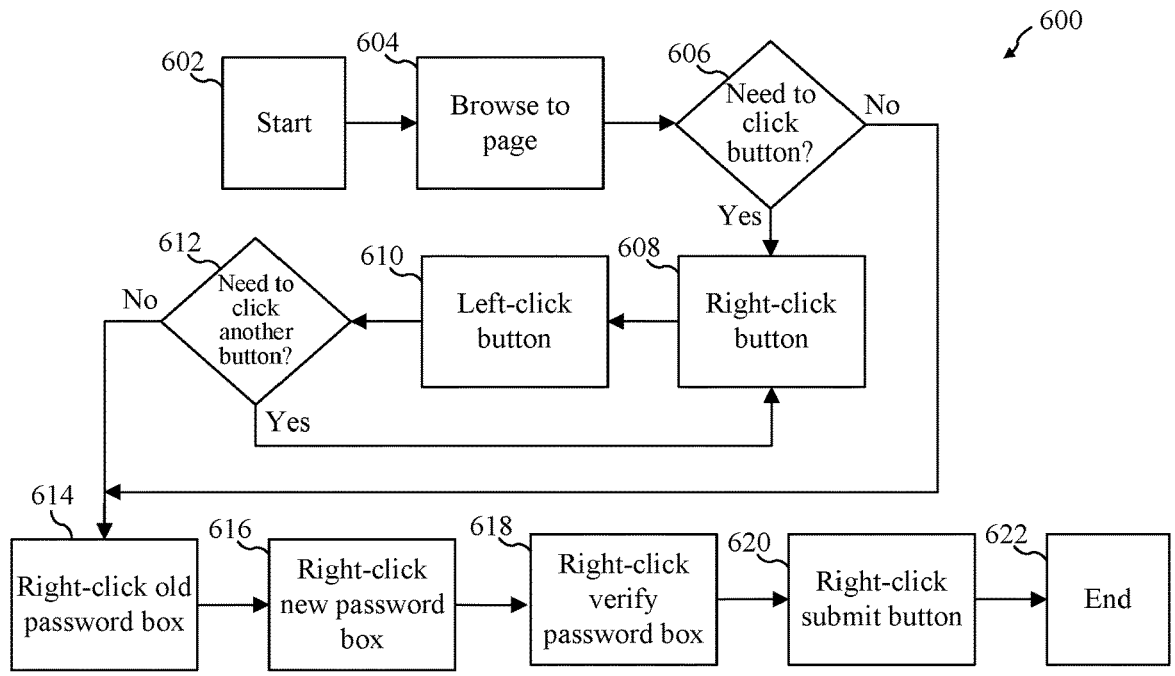
FIG. 6 depicts a flowchart of an example change password training process for developing an abstraction module for an IoT device with a web-based administration interface.
Figure 7:
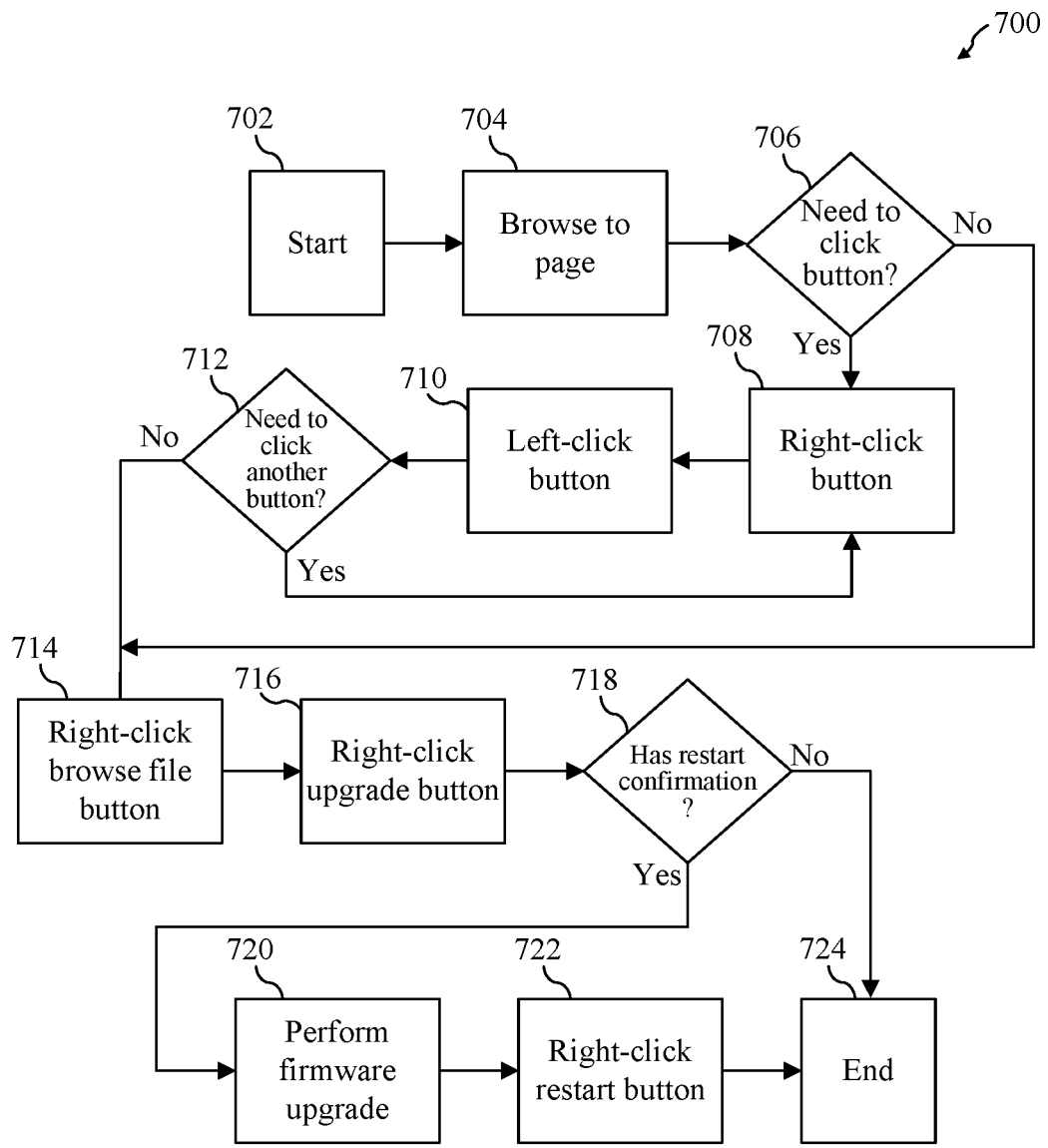
FIG. 7 depicts a flowchart of an example upgrade firmware training process for developing an abstraction module for an IoT device with a web-based administration interface.

By way of further illustration, FIG. 5 depicts a flowchart 500 of an example configuration change training process for developing an abstraction module for an IoT device with a web-based administration interface, FIG. 6 depicts a flowchart 600 of an example change password training process for developing an abstraction module for an IoT device with a web-based administration interface, and FIG. 7 depicts a flowchart 700 of an example upgrade firmware training process for developing an abstraction module for an IoT device with a web-based administration interface, each of which may be implemented by abstraction module development utility 102.

As shown in FIG. 5, the configuration change training process starts at step 502 after which control immediately flows to step 504. At step 504, the developer (e.g., responsive to prompting by abstraction module development utility 102) fills in the name of the value for which a configuration change is desired, after which control flows to step 506. At step 506, abstraction module development utility 102 associates the value identified by the developer with the corresponding data query value, after which control flows to step 508. At step 508, the developer browses to the page on which the value is located, after which control flows to decision step 510. At decision step 510, it is determined whether a button must be clicked to access the value. If a button need not be clicked, control flows to step 518. However, if a button must be clicked, then (e.g., responsive to prompting by abstraction module development utility 102) the developer right-clicks the button as shown at step 512 to enable detection of the button, and then left-clicks the button to activate it as shown at step 514. Control then flows to decision step 516 to determine whether another button must be clicked to access the value. If so, the process is repeated (as shown by control returning to step 512); otherwise, control flows to step 518.

At step 518, the developer (e.g., responsive to prompting by abstraction module development utility 102) right-clicks on the value field thereby enabling detection thereof by abstraction module development utility 102, after which control flows to step 520. At step 520, the developer (e.g., responsive to prompting by abstraction module development utility 102) right-clicks the submit button, thereby enabling detection thereof by abstraction module development utility 102, after which control flows to decision step 522. At decision step 522, it is determined whether another value for which a configured change is desired needs to be detected. If so, control returns to step 504. If not, the process ends at step 524.

As shown in FIG. 6, the change password training process starts at step 602 after which control immediately flows to step 604. At step 604, the developer browses to the relevant page for implementing a password change, after which control flows to decision step 606. At decision step 606, it is determined whether a button must be clicked to access the change password feature. If a button need not be clicked, control flows to step 614. However, if a button must be clicked, then (e.g., responsive to prompting by abstraction module development utility 102) the developer right-clicks the button as shown at step 608 to enable detection of the button, and then left-clicks the button to activate it as shown at step 610. Control then flows to decision step 612 to determine whether another button must be clicked to access the change password feature. If so, the process is repeated (as shown by control returning to step 608); otherwise, control flows to step 614.

At step 614, the developer (e.g., responsive to prompting by abstraction module development utility 102) right-clicks on the old password field thereby enabling detection thereof by abstraction module development utility 102, after which control flows to step 616. At step 616, the developer (e.g., responsive to prompting by abstraction module development utility 102) right-clicks on the new password field thereby enabling detection thereof by abstraction module development utility 102, after which control flows to step 618. At step 618, the developer (e.g., responsive to prompting by abstraction module development utility 102) right-clicks on the verify password field thereby enabling detection thereof by abstraction module development utility 102, after which control flows to step 620. At step 620, the developer (e.g., responsive to prompting by abstraction module development utility 102) right-clicks the submit button, thereby enabling detection thereof by abstraction module development utility 102, after which the process ends at step 622.

As shown in FIG. 7, the upgrade firmware training process starts at step 702 after which control immediately flows to step 704. At step 704, the developer browses to the relevant page for implementing a firmware upgrade, after which control flows to decision step 706. At decision step 706, it is determined whether a button must be clicked to access the upgrade firmware feature. If a button need not be clicked, control flows to step 714. However, if a button must be clicked, then (e.g., responsive to prompting by abstraction module development utility 102) the developer right-clicks the button as shown at step 708 to enable detection of the button, and then left-clicks the button to activate it as shown at step 710. Control then flows to decision step 712 to determine whether another button must be clicked to access the upgrade firmware feature. If so, the process is repeated (as shown by control returning to step 708); otherwise, control flows to step 714.

At step 714, the developer (e.g., responsive to prompting by abstraction module development utility 102) right-clicks on the browse file button thereby enabling detection thereof by abstraction module development utility 102, after which control flows to step 716. At step 716, the developer (e.g., responsive to prompting by abstraction module development utility 102) right-clicks on the upgrade button thereby enabling detection thereof by abstraction module development utility 102, after which control flows to decision step 718. At decision step 718, it is determined whether the upgrade firmware process requires a restart confirmation. If not, the process ends at step 724. However, if a restart confirmation is required, then control flows to step 720 in which a firmware upgrade is performed, after which control flows to step 722. At step 722, the developer (e.g., responsive to prompting by abstraction module development utility 102) right-clicks on the restart button thereby enabling detection thereof by abstraction module development utility 102, after which the process ends at step 724.

When all necessary training processes are complete, the developer completes the creation of the abstraction module, which as noted above can be shared through the cloud (or other network-based transmission) or saved as a file locally and then manually copied to IoT device management system 104.

B. Command-Line-Based Module Development

Command-line-based interfaces are usually presented using the telnet or the Secure Shell (SSH) protocol. In an embodiment, abstraction module development utility 102 includes its own telnet/SSH client through which the developer can interact with a sample unit of the IoT device model for which the abstraction module is being developed. Abstraction module development utility 102 can then inspect all traffic going in both directions. In the case of SSH, since abstraction module development utility 102 itself comprises the client, encryption is not a concern. The supported operations can be categorized into data position detection, interface identification and commands.

1. Data Position Detection—Interactive

As in the web interface variant, IoT device management system 104 needs to be able to extract desired data from the output returned by various commands. In order to detect where the desired data is located within the command output, the developer provides the command needed to display the needed information, as well the interface/menu from which the command is issued if needed (see "Interface Identification" below). Abstraction module development utility 102 issues the command and displays the output and requires the developer to mark or copy the desired data from the output text.

In an embodiment, the position of the data is then identified by the following method. If there is any text to the left or right of the desired value on the same row, then it is used as an indicator. Otherwise, the row number (relative to the beginning of the output) is used as the indicator. If the value has more than one entry, the developer can mark the entire list and provide the separator text (e.g., comma, semicolon). Alternatively, the entries can also be split by marking the first and the last entries (in addition to the entire list). If the list spans more than one row, then the row immediately following the list is used as an end indicator.

2. Data Position Detection—Non-Interactive

Figures 8, 9:
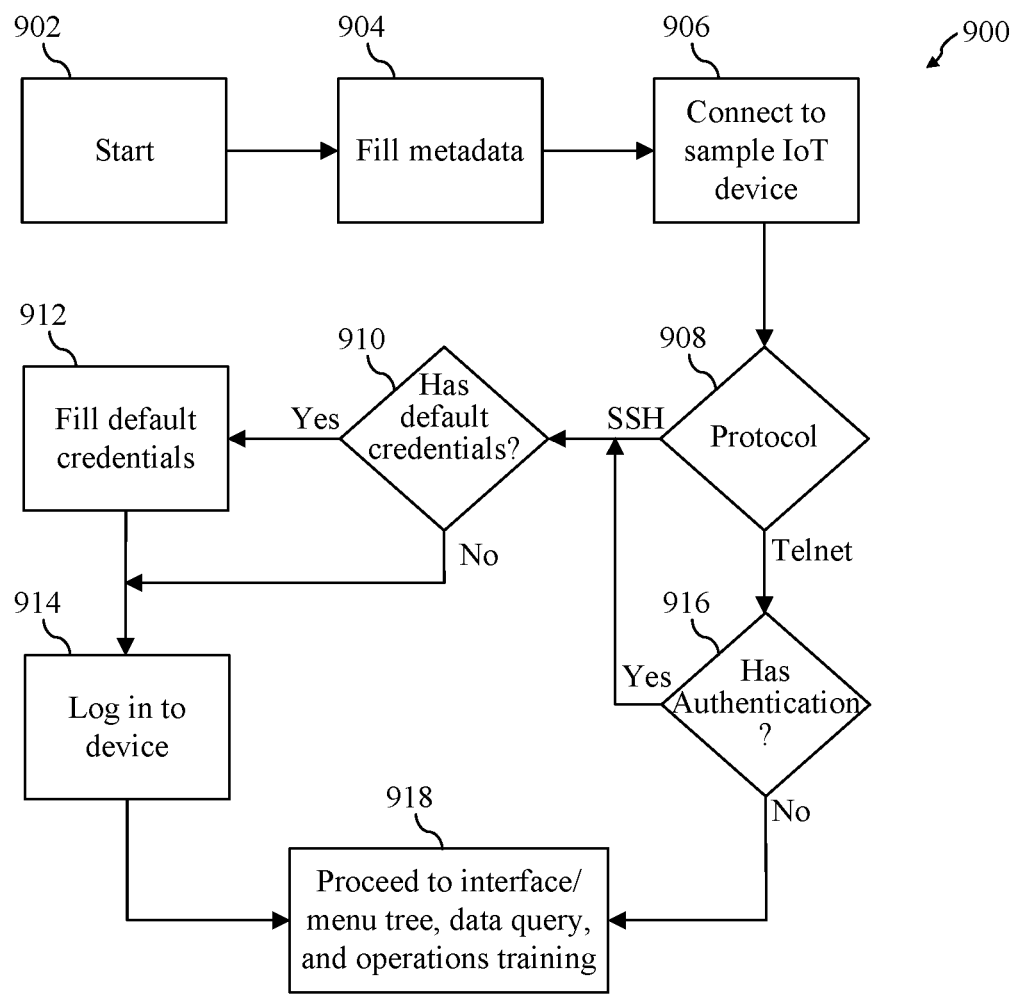
FIG. 8 depicts an example of command line interface output upon which a non-interactive data position detection process may be performed in accordance with an embodiment.
FIG. 9 depicts a flowchart of a first portion of a workflow for developing an abstraction module for an IoT device with a command-line-based administration interface, wherein the first portion of the workflow includes login training.

As in the web interface case, abstraction module development utility 102 can attempt to automatically detect the position of relevant data using nearby text titles as hints. If the output contains one or more of several predefined title texts (e.g., "Firmware Version", "Status", "Model" etc.), then any further text on the same line is assumed to be the value to be extracted. Text separators such as colons and multiple spaces are considered. If the title text is the only text in the row then the text of the row below it is assumed to be the value, unless it itself is determined to be a title, in which case the value is assumed to be empty. FIG. 8 illustrates an example of command line interface output 800 upon which the aforementioned non-interactive data position detection process may be performed.

To avoid misidentifications, abstraction module development utility 102 can also work in a semi-interactive mode, in which the extracted value is displayed to the developer, who confirms the correctness of the extracted value. If it is incorrect, the developer is provided with the ability to switch to interactive mode for that value and switch back to non-interactive as needed.

3. Error Detection and Handling

In some cases, the output format may be changed according to related or unrelated configuration changes. An issue may also arise when two IoT device models from the same vendor present roughly the same administration interface albeit with subtle differences. This may result in the wrong value being extracted when the created abstraction module is used by IoT device management system 104.

Abstraction module development utility 102 may attempt to avoid such obstacles by using a "forward error correction by value format" method and/or a "forward error correction by title" method. Each of these methods will now be described.

In accordance with the "forward error correction by value format" method, abstraction module development utility 102 can make an educated guess regarding the format of the value. For instance, the firmware version of a specific IoT device may be determined to be four numeric values separated by dots, with the last one representing a date. Abstraction module development utility 102 creates a regular expression of the guessed format and saves it into the module. IoT device management system 104 which uses the abstraction module can use this regular expression to validate the correctness of the extracted value and if incorrect may also be able to find the correct value.

In accordance with the "forward error correction by title" method, abstraction module development utility 102 can identify and save the title text proceeding the extracted value into the abstraction module as an indicator. The developer can interactively change this if it is incorrectly detected. The title as well as its location are saved into the abstraction module and can be used by IoT device management system 104 to validate the extracted value and/or find the new location if changed.

4. Interface Identification

Some command line interfaces are interface/menu based. For example, to display the current IP address, some command line interfaces require a user to issue one command (e.g., "network") to switch from the main interface to a dedicated "network" interface, then another command (e.g., "show") to view current data. This is common in some devices, notably Cisco® network routers. Other devices use a menu-based approach (e.g., press "7" for the network configuration, then "1" to display current values).

If these are used, abstraction module development utility 102 builds an interface/menu tree, which is saved in the abstraction module. To support a new interface/menu, the developer first provides the parent interface (i.e., the interface from which the new interface can be accessed) and the command needed to access the new interface. Abstraction module development utility 102 then displays the output of the command. If the IoT device uses menus, then the developer can mark a fixed line (e.g., header) that will be used to identify said menu (which is saved into the abstraction module). In case of different command interfaces, the change in the command prompt is used as the interface indicator. In case there is neither a menu output nor a change of the command prompt, the developer may specify a command whose output changes according to the current interface. The use of said command by IoT device management system 104 may be unpredictable, therefore it is important to use a command which does not perform any action on the device, even when issued in the wrong interface. For instance, in the case of a Cisco® router configuration, the "show version" command displays the current firmware version if issued from the main interface but is an invalid command in other interfaces and will therefore result in an error being displayed if issued. In both cases however it will not modify the behavior of the IoT device, therefore it is safe to use in order to discern the current interface.

Finally, the developer also specifies the command/key used to return to the previous interface/menu (if there is a command/key used to return directly to the main interface/menu, it can be specified as well), allowing IoT device management system 104 to navigate through the various functions without reconnecting each time.

After creating an interface/menu tree, the developer specifies the interface/menu from which each command is issued. IoT device management system 104 will navigate to said interface/menu before issuing said command.

5. Commands

In order to perform operations, as well as to request data (which is then parsed by the method described in "Data Position Detection"), IoT device management system 104 needs to issue various commands to the device. When creating an abstraction module, the developer associates each operation with the needed command. The developer can specify a single command or a sequence of multiple commands that will be issued by IoT device management system 104 through the abstraction module. If the system uses interfaces/menus, then the developer also specifies from which interface/menu the command is issued (an interface/menu tree must be at least partially built before this can be done).

A command may take various arguments, some of which should be set by IoT device management system 104. For instance, for a password change command, IoT device management system 104 must supply the old and the new password. Therefore, when the developer enters a command to abstraction module development utility 102, various system-recognized arguments can be specified. For example:

passwd {old_password} {new_password}

This instructs the system to issue a command named "passwd" followed by the old password and the new password. For instance, if the current password is "abc123" and the system user wishes to change it to "def456" then the above command will be translated to "passwd abc123 def456". Some devices have a different password change method, requiring the entry of old password, new password and verification of new password separately from the actual command, in which cases the command is specified as a multiple command sequence:passwd {old_password}
{new_password}
{new_password}

In this case, the new password appears twice in order to satisfy the "verify password" requirement.

Various arguments recognized by the system also include {new_value} for configuration change commands and {firmware_bin} for firmware upgrades. Any unrecognized value is treated as a literal. Escape sequences are used to denote literal "{"s.

6. Device Identification

As in the case of web interfaces, IoT device management system 104 will attempt to associate each IoT device scanned with an appropriate module. This may be achieved using the "banner", i.e., the data sent by the server upon a client connection (e.g., if the server sends only the message "User Access Verification" then it can be assumed to be a Cisco® device). In case the banner contains any non-constant data (e.g., hostname or IP address), abstraction module development utility 102 displays the detected banner and the developer may mark the constant regions (if the entire data is constant the developer does not need to do anything).

In the case of SSH, authentication takes place before a system banner is sent (the banner sent by the SSH service before authentication only specifies the identity of the SSH service itself, which is not always a clear indication). Unless the SSH service identification string is unique to a specific device, IoT device management system 104 will only be able to detect SSH-based devices if correct login credentials are supplied, however since SSH authentication is a standard part of the SSH protocol, the system can authenticate to the device first (assuming that credentials are available) and attempt to find a matching module according to the banner only after logging in.

A fuzzy hash of the banner can also be saved, which can be used for advanced IoT device identification.

7. Module Creation Workflow—Command-Line-Based

An example workflow for creating an abstraction module for an IoT device whose administration interface is command-line-based will now be described. In particular, FIG. 9 depicts a flowchart 900 of a first portion of a workflow for developing an abstraction module for an IoT device whose administration interface is command-line-based, wherein the first portion of the workflow includes login training.

As shown in FIG. 9, the process of flowchart 900 starts at step 902 after which control flows to step 904. At step 904, the developer (e.g., responsive to prompting by abstraction module development utility 102) inputs basic metadata about the relevant IoT device (e.g., the device model and vendor) as well as the protocol being used (telnet or SSH), after which control flows to step 906.

At step 906, a connection to a sample IoT device is established. For example, the developer may enter an IP address of an existing IoT device of said model and vendor. Abstraction module development utility 102 then starts it own telnet/SSH client and connects to the IoT device. After this, control flows to decision step 908.

At decision step 908, it is determined whether telnet or SSH is being used. If SSH is being used, control flows to decision step 910. If telnet is being used, control flows to decision step 916 in which the developer (e.g., responsive to prompting by abstraction module development utility 102) specifies whether the IoT device requires authentication upon connection or not. If authentication upon connection is not required, then control flows from decision step 916 to step 918, wherein the workflow proceeds to interface/menu tree, data query and operations training, each of which will be discussed below. If authentication is required upon connection, then control flows to decision step 910.

At decision step 910, it is determined whether the IoT device has default credentials. If the IoT device does not have default credentials, then control flows to step 914. However, if the IoT device does have default credentials, the developer (e.g., responsive to prompting by abstraction module development utility 102) will provide those as shown at step 912, after which control flows to step 914.

At step 914, the developer logs in and then specifies a data string which can be used as an indication of a successful login. The command prompt is usually a good indication; however, any data can be used as long as it is guaranteed to appear if and only if login is successful. After step 914, control flows to step 918, wherein the workflow proceeds to interface/menu tree, data query and operations training, each of which will be discussed below.

In an embodiment, after the portion of the workflow depicted in flowchart 900 of FIG. 9 is complete, abstraction module development utility 102 presents an interface via which the developer can perform interface/menu tree training, data query training and operations training.

Interface/Menu tree training is only used if the IoT device administration interface makes use of such trees. The main interface/menu is automatically present in this interface. For any other interface/menu the developer needs to specify the parent interface/menu, which command/key is used to access the sub-interface/menu, which command/key goes back to the previous interface/menu and which command/key goes back to the main interface/menu (if available). Abstraction module development utility 102 then launches that interface/menu and shows the output. The developer marks any part of the output which can be used to identify said interface/menu. If no such data is available, the developer needs to specify a command valid within that interface/menu context whose output can be used to identify the interface/menu. Abstraction module development utility 102 then issues the command and the developer marks the identifying data. Since the timing of the use of the command by the system is unpredictable, the command must not cause any changes to the system, even if issued from the wrong interface/menu.

Figure 10:
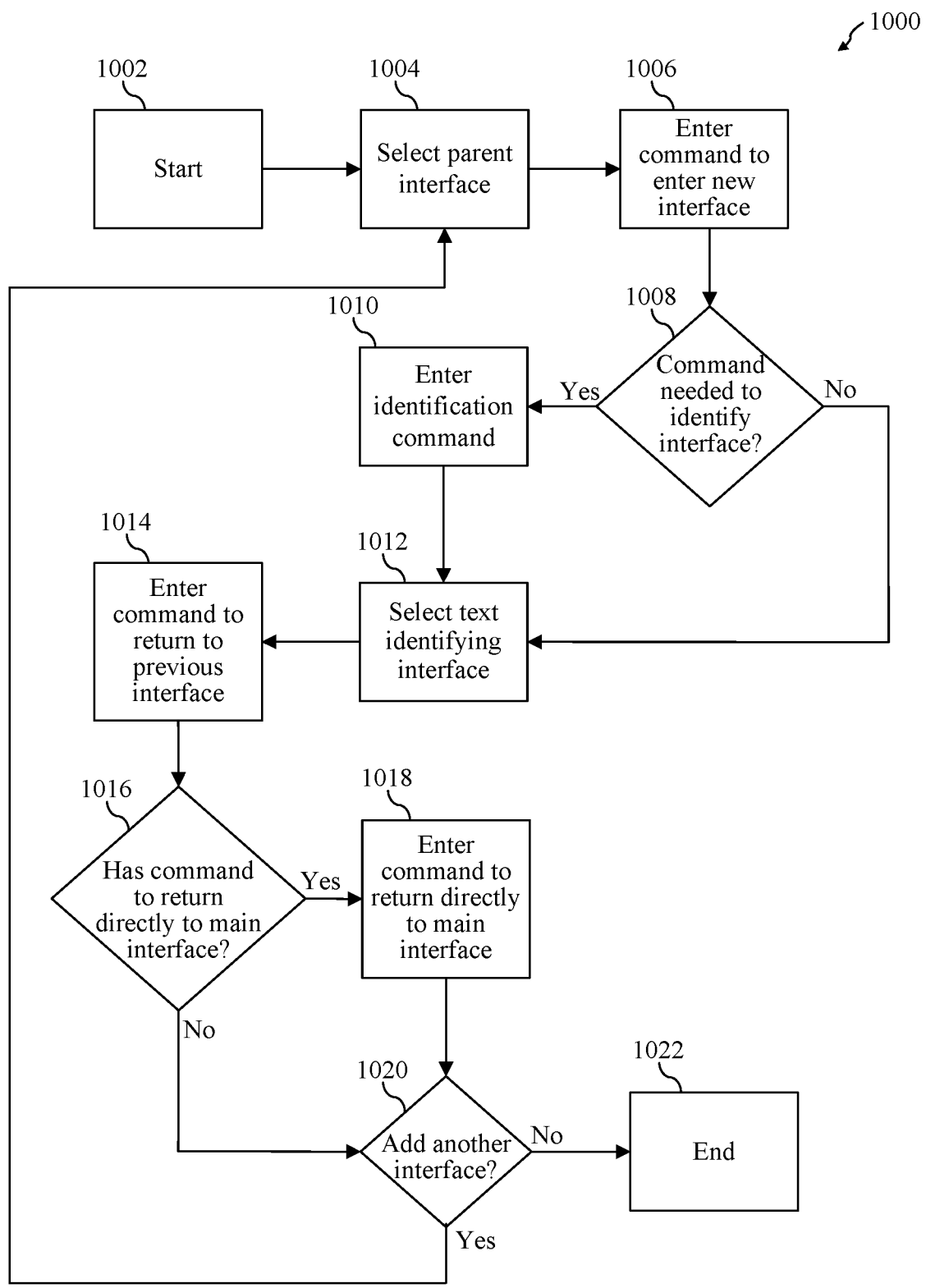
FIG. 10 depicts a flowchart of adding commands (command line actions) as part of a training process for developing an abstraction module for an IoT device with a command-line-based administration interface.

By way of further illustration, FIG. 10 depicts a flowchart 1000 of an example interface/menu tree training process for developing an abstraction module for an IoT device with a command-line-based administration interface. The process of flowchart 1000 may implemented by abstraction module development utility 102.

As shown in FIG. 10, the interface/menu tree training process starts at step 1002 after which control immediately flows to step 1004. At step 1004, the developer specifies a parent interface/menu to be added to the interface/menu tree, after which control flows to step 1006. At step 1006, the developer enters a command to enter the relevant interface/menu after which control flows to decision step 1008. At decision step 1008, it is determined whether a command is needed to identify the relevant interface/menu. If a command is needed to identify the relevant interface/menu, then the developer enters the identification command as shown at step 1010, after which control flows to step 1012. If a command is not needed to identify the relevant interface/menu, then control flows directly from decision step 1008 to step 1012.

At step 1012, the developer selects text that identifies the relevant interface/menu, after which control flows to step 1014. At step 1014, the developer enters the command to return to the previous interface/menu, after which control flows to decision step 1016. At decision step 1016 it is determined whether the relevant interface/menu has a command for returning directly to the main interface/menu. If the relevant interface/menu has a command for returning directly to the main interface/menu, then the developer enters the command to return directly to the main interface/menu as shown at step 1018, after which control flows to decision step 1020. If the relevant interface/menu does not have a command for returning directly to the main interface/menu, the control flows directly from decision step 1016 to decision step 1020.

At decision step 1020, it is determined whether there is another interface/menu that should be added to the interface/menu tree. If there is another interface/menu to be added, then control returns to step 1004 and the process is repeated. If there are no other interfaces/menus to be added, then the process ends at step 1022.

Data query training is used to develop the portion of the abstraction module that will enable IoT device management system 104 to pull various data from the IoT device configuration, such as status, firmware version and various configuration values. To add a new value to the values being queried, the developer enters the name of the value (e.g., "Firmware Version") and proceeds according to the "Data Position Detection" section above).

Figure 11:
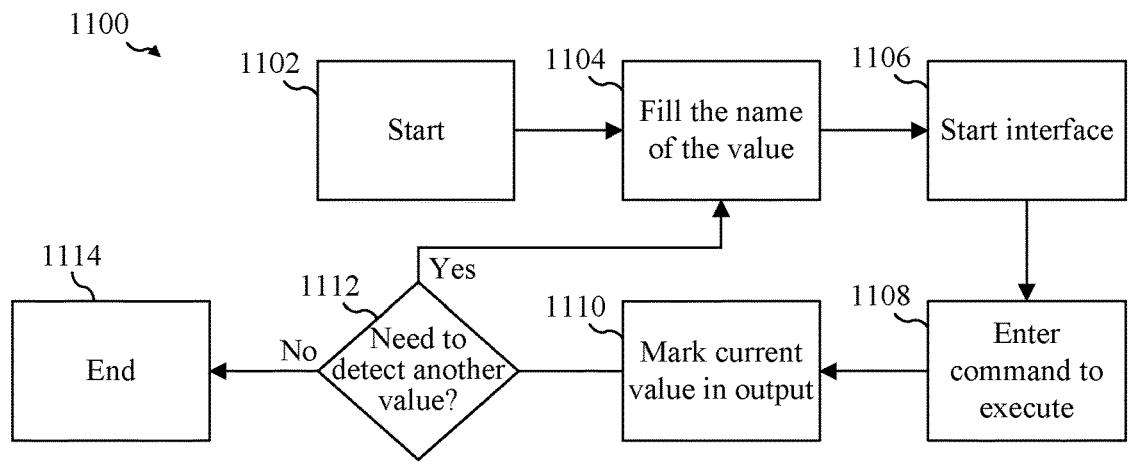
FIG. 11 depicts a flowchart of an example data query training process for developing an abstraction module for an IoT device with a command-line-based administration interface.

By way of further illustration, FIG. 11 depicts a flowchart 1100 of an example data query training process for an IoT device having a command-line-based administration interface that may be implemented by abstraction module development utility 102.

As shown in FIG. 11, the data query training process begins at step 1102 after which control immediately flows to step 1104. At step 1104, the developer (e.g., responsive to prompting by abstraction module development utility 102) fills in the name of the value to be queried, after which control flows to step 1106. At step 1106, the developer launches the command line interface, after which control flows to step 1108. At step 1108, the developer (e.g., responsive to prompting by abstraction module development utility 102) enters the command that must be executed to cause the relevant value to be output, after which control flows to step 1110. At step 1110, the developer (e.g., responsive to prompting by abstraction module development utility 102) marks the current value in the output, after which control flows to decision step 1112 to determine whether another value to be queried needs to be detected. If so, control returns to step 1104. If not, the process ends at step 1114.

Operations training is used to develop the portion of the abstraction module that will enable IoT device management system 104 to perform active operations, such as password changes, firmware updates and configuration changes. The developer specifies a command and arguments for each operation supported (see the "Commands" section above).

Figure 12:
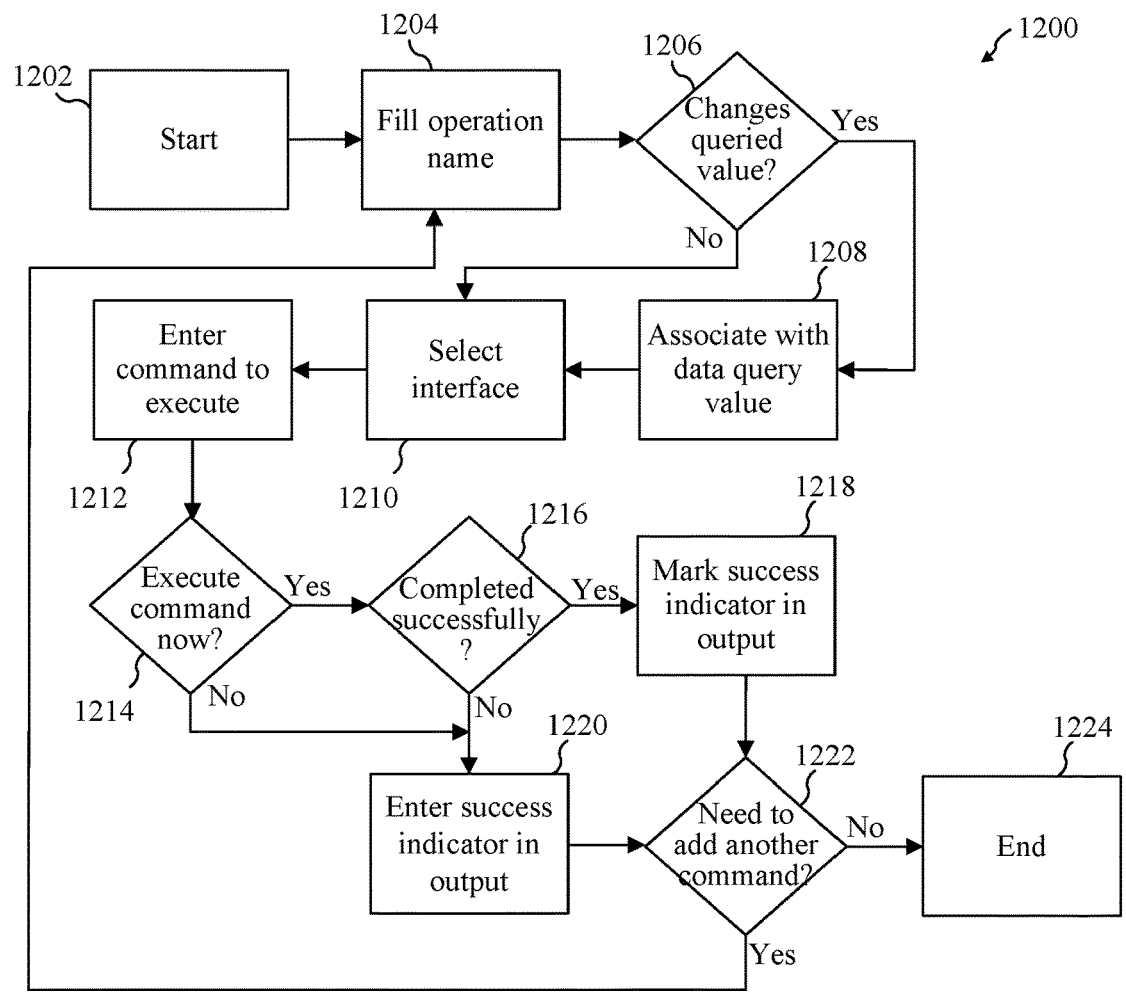
FIG. 12 depicts a flowchart of an example operations training process for developing an abstraction module for an IoT device with a command-line-based administration interface.

By way of further illustration, FIG. 12 depicts a flowchart 1200 of an example operations training process for developing an abstraction module for an IoT device with a command-line-based administration interface that may be implemented by abstraction module development utility 102.

As shown in FIG. 12, the operations training process starts at step 1202 after which control immediately flows to step 1204. At step 1204, the developer (e.g., responsive to prompting by abstraction module development utility 102) fills in the name of the operation to be performed, after which control flows to decision step 1206. At decision step 1206, it is determined whether the operation is one that will change a queried value of the IoT device. If the operation is one that will change a queried value of the IoT device, then the operation is associated with the relevant data query value as shown at step 1208, after which control flows to step 1210. If the operation is not one that will change a queried value of the IoT device, then control flow directly from decision step 1206 to step 1210.

At step 1210, the developer (e.g., responsive to prompting by abstraction module development utility 102) selects the interface/menu required to execute the command, after which control flows to step 1212. At step 1212, the developer (e.g., responsive to prompting by abstraction module development utility 102) enters the command to be executed, after which control flows to decision step 1214.

At decision step 1214, the developer determines whether to execute the command or not. If the developer decides to execute the command, then the developer executes the command and control flows to decision step 1216, where it is determined whether the command has executed successfully. If the command has executed successfully, then the developer (e.g., responsive to prompting by abstraction module development utility 102) marks the success indicator in the output, after which control flows to decision step 1222. If the developer decides not to execute the command in decision step 1214 or if the command has been executed but has not completed successfully in decision step 1216, the control flows to step 1220 in which the developer (e.g., responsive to prompting by abstraction module development utility 102) enters the success indicator in the output, after which control flows to decision step 1222.

At decision step 1222, it is determined whether another command is to be added. If so, then control returns to step 1204 and the process is repeated. If not, the process ends at step 1224.

When all necessary training processes are complete, the developer completes the creation of the abstraction module, which as noted above can be shared through the cloud (or other network-based transmission) or saved as a file locally and then manually copied to IoT device management system 104.

C. SNMP-Based Module Development

Simple Network Management Protocol (SNMP) is a dedicated protocol used for centralized administration of network devices (machine to machine rather than human to machine). SNMP has been used for centralized management of devices for a long time but requires the devices being managed to support it, unlike the system described herein, which does not require any standard cooperation from the device. The system does however support SNMP for those devices which do support it.

SNMP makes use of repositories called "Management Information Base" (aka MIB). Some MIBs are standard part of SNMP, while other MIBs may be vendor or device specific. When developing an SNMP-based abstraction module, the developer needs to provide abstraction module development utility 102 with the required device-specific MIBs if such MIBs are used by the IoT device. The operations supported can be categorized into data position detection and commands.

1. Data Position Detection

In most cases, SNMP provides a different Object Identifier (OID) for each value to be queried, in which case the developer only needs to specify the OID to query. In case no dedicated OID is available for the requested value, data position detection can be used. Abstraction module development utility 102 presents the response for the given OID and the developer marks the desired value. Abstraction module development utility 102 then uses the text on both sides of the marked value in order to identify its position.

2. Commands

A command is an OID or a sequence of OIDs, along with optional arguments for each one.

3. Device Identification

SNMP has a built-in identification mechanism, namely the sysObjectID (OID 1.3.6.1.2.1.1.1.2) query. sysObjectID is a standard OID which is expected to be available on all devices implementing SNMP and returns a unique value per-device. For IoT devices with SNMP-based administration interfaces, abstract module development utility 102 automatically queries this OID and the value is saved into the abstraction module.

A fuzzy hash of the reply can also be saved, which can be used for advanced device identification.

4. Module Creation Workflow—SNMP-Based

An example workflow for creating an abstraction module for an IoT device whose administration interface is SNMP-based will now be described. In particular, FIG. 13 depicts a flowchart 1300 of a first portion of a workflow for developing an abstraction module for an IoT device whose administration interface is SNMP-based.

Figure 13:
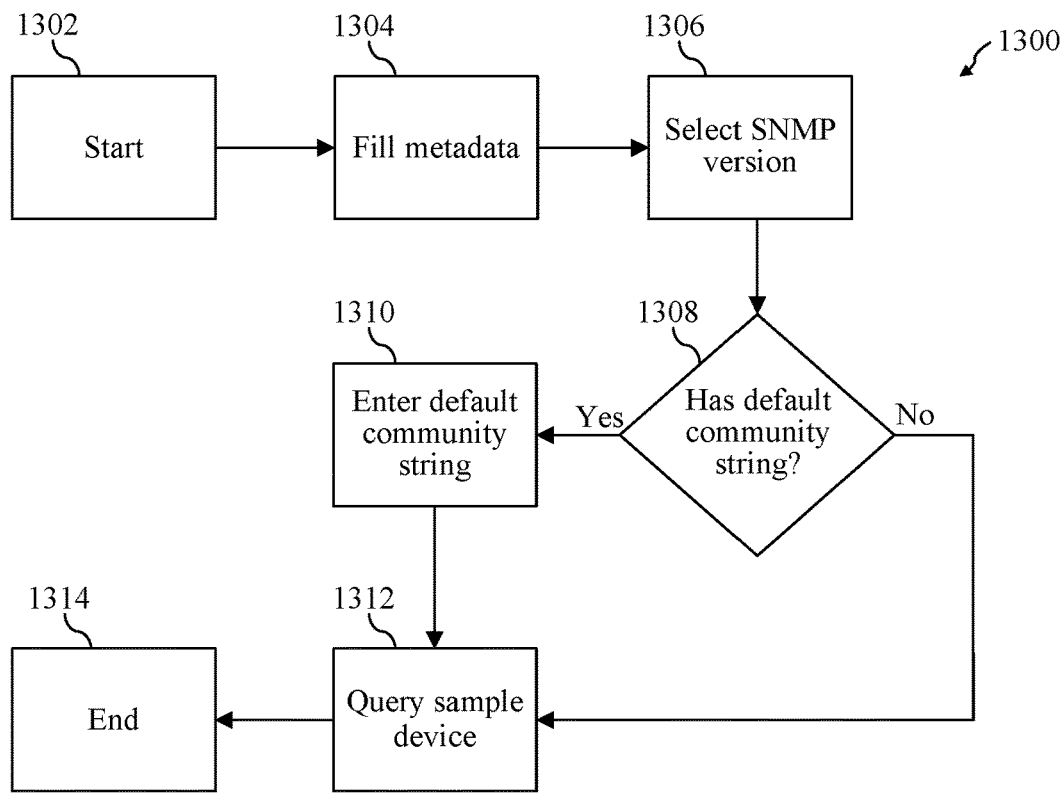
FIG. 13 depicts a flowchart of a first portion of a workflow for developing an abstraction module for an IoT device whose administration interface is command-line-based.

As shown in FIG. 13, the process of flowchart 1300 starts at step 1302 after which control flows to step 1304. At step 1304, the developer (e.g., responsive to prompting by abstraction module development utility 102) inputs basic metadata about the relevant IoT device (e.g., the device model and vendor), after which control flows to step 1306. At step 1306, the developer (e.g., responsive to prompting by abstraction module development utility 102) inputs the SNMP version being used, after which control flows to decision step 1308.

At decision step 1308, it is determined if the IoT device has a default community string. If the device has a default community string, then the developer (e.g., responsive to prompting by abstraction module development utility 102) enters the default community string as shown at step 1310, after which control flows to step 1312. If the device does not have a default community string, then control flows directly from decision step 1308 to step 1312. In either case, the developer enters an IP address of an existing device of the said model, as well as the SNMP community string of that device.

At step 1312, abstraction module development utility 102 performs a sysObjectID query, which is used for device identification as well as for testing connectivity and verifying successful "authentication" (i.e., correctness of the community string). After step 1312, the process ends at step 1314.

In an embodiment, after the portion of the workflow depicted in flowchart 1300 of FIG. 13 is complete, abstraction module development utility 102 presents an interface via which the developer can perform data query training and operations training.

Data query training is used to develop the portion of the abstraction module that will enable IoT device management system 104 to pull various data from the IoT device configuration, such as status, firmware version and various configuration values. To add a new value to the values being queried, the developer enters the name of the value (e.g., "Firmware Version") and proceeds according to the "Data Position Detection" section above.

Figure 14:
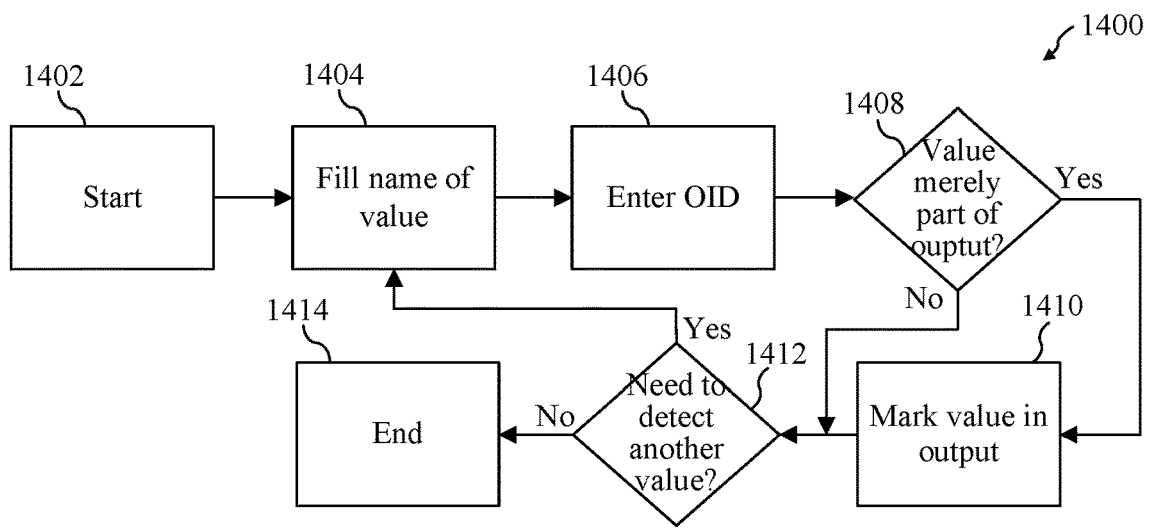
FIG. 14 depicts a flowchart of an example data query training process for developing an abstraction module for an IoT device with a SNMP-based administration interface.

By way of further illustration, FIG. 14 depicts a flowchart 1400 of an example data query training process for an IoT device having a SNMP-based administration interface that may be implemented by abstraction module development utility 102.

As shown in FIG. 14, the data query training process starts at step 1402 after which control immediately flows to step 1404. At step 1404, the developer (e.g., responsive to prompting by abstraction module development utility 102) fills in the name of the value to be queried, after which control flows to step 1406. At step 1406, the developer (e.g., responsive to prompting by abstraction module development utility 102) enters the OID of the value to be queried, after which control flows to decision step 1408. At decision step 1408, it is determined whether the value is the only output or is merely part of the output. If the value is merely part of the output, then the developer (e.g., responsive to prompting by abstraction module development utility 102) marks the value in the output as shown at step 1410, after which control flows to decision step 1412. If the value is the only output, then control flows directly from decision step 1408 to decision step 1412.

At decision step 1412, it is determined whether another value to be queried needs to be detected. If so, control returns to step 1404. If not, the process ends at step 1414.

Operations training is used to develop the portion of the abstraction module that will enable IoT device management system 104 to perform active operations, such as password changes, firmware updates and configuration changes. The developer specifies a command and arguments for each operation supported (see the "Commands" section above).

Figure 15:
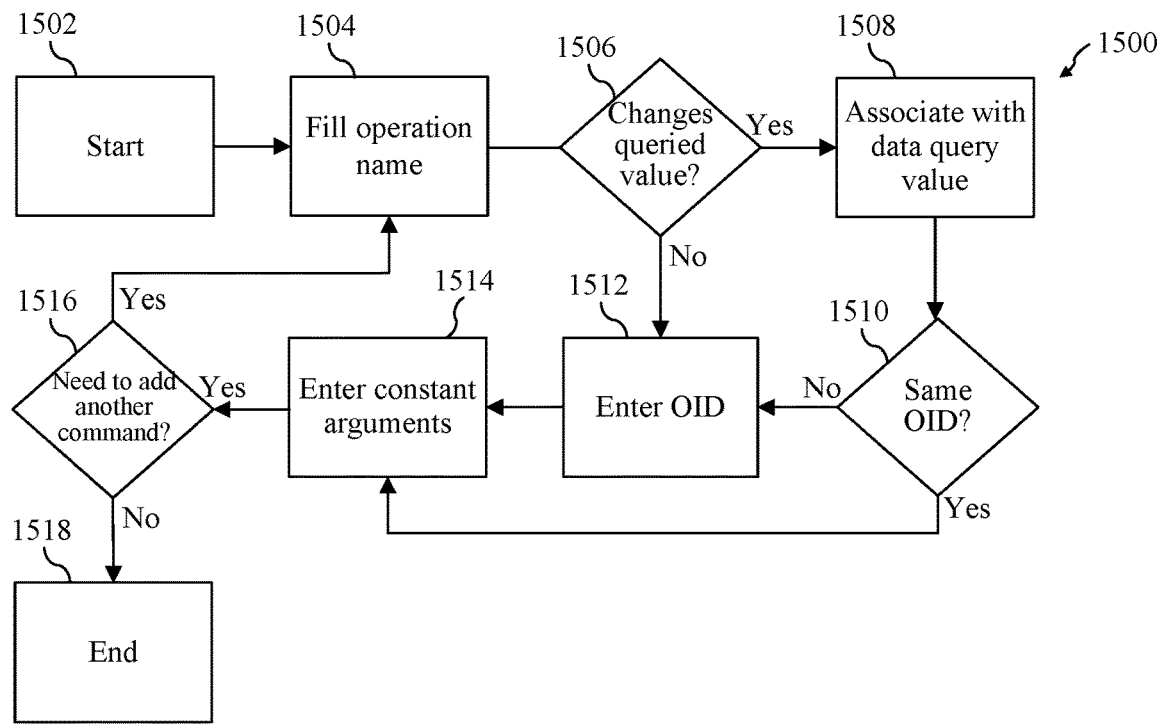
FIG. 15 depicts a flowchart of an example operations training process for developing an abstraction module for an IoT device with a SNMP-based administration interface.

By way of further illustration, FIG. 15 depicts a flowchart of an example operations training process for developing an abstraction module for an IoT device with a SNMP-based administration interface that may be implemented by abstraction module development utility 102.

As shown in FIG. 15, the operations training process starts at step 1502 after which control immediately flows to step 1504. At step 1504, the developer (e.g., responsive to prompting by abstraction module development utility 102) fills in the name of the operation to be performed, after which control flows to decision step 1506. At decision step 1506, it is determined whether the operation is one that will change a queried value of the IoT device. If the operation is one that will change a queried value of the IoT device, then the operation is associated with the relevant data query value as shown at step 1508, after which control flows to decision step 1510. At decision step 1510, it is determined if the data query value has the same OID as the command.

If it is determined in decision step 1506 that the operation does not change an already queried value of the IoT device or it needs to be associated with a (new) data query 1508. If it is determined in decision step 1510 that the data query value does not have the same OID as the command, then control flows to step 1512. In step 1512, the developer (e.g., responsive to prompting by abstraction module development utility 102) enters the OID associated with the command, after which control flows to step 1514. If it is determined in decision step 1510 that the data query value does not have the same OID as the command, then control flows directly from decision step 1510 to step 1514.

In step 1514, the developer (e.g., responsive to prompting by abstraction module development utility 102) enters any constant arguments of the command, after which control flows to decision step 1516. At decision step 1516, it is determined whether another command is to be added. If so, then control returns to step 1504 and the process is repeated. If not, the process ends at step 1518.

When all necessary training processes are complete, the developer completes the creation of the abstraction module, which as noted above can be shared through the cloud (or other network-based transmission) or saved as a file locally and then manually copied to IoT device management system 104.

VI. IoT Device Management System

IoT device management system 104 uses the abstraction modules described above in order to query, summarize, and present security and operational alerts, as well as security exposures, in a centralized manner, as well as an interface of performing management operations on multiple devices in bulk. IoT device management system 104 may provide a process by which an abstraction module may be registered therewith.

A. Querying Devices

Data from IoT devices can be actively queried by connecting to devices' administration interfaces, passively by monitoring network traffic using SPAN ports (both administration and usage) or a combination of the above. If both passive and active methods are used, a synergy can be created, e.g., if administration credentials are found by passive monitoring, they can be used for active queries without the user having to input them manually.

Active scans can be launched manually or periodically.

1. Scan and Device Identification

Figure 16:
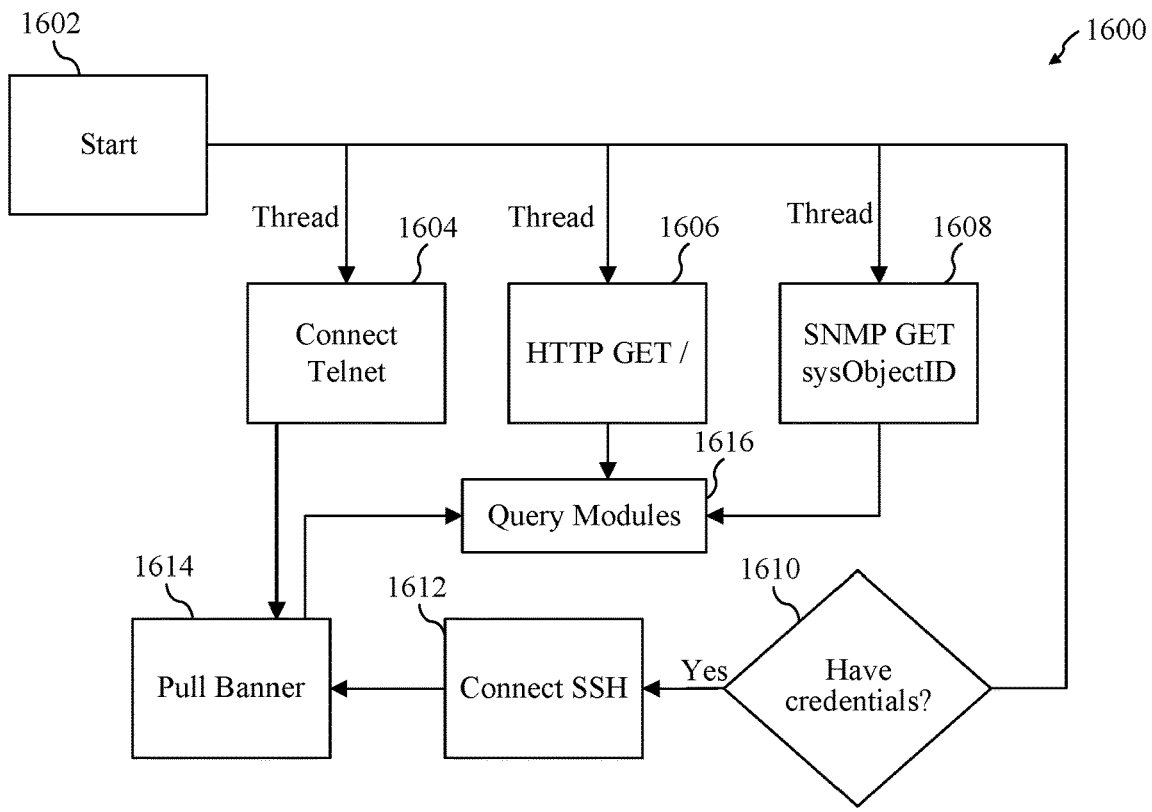
FIG. 16 depicts an example IoT device identification process that may be performed by an IoT device management system in accordance with an embodiment.

FIG. 16 depicts a flowchart 1600 of an example process for scanning one or more IoT devices to obtaining identification therefrom that may be performed by IoT device management system 104.

As shown in FIG. 16, the process of flowchart 1600 begins at step 1602, after which control flows to steps 1604, 1606 and 1608, which may be executed in parallel via multiple threads within a multi-threaded computing process. In particular, IoT device management system 104 may scan IoT devices at certain IP address ranges or specific IPs based on the user preferences, and use multiple threads to speed up the scanning process. For every IP scanned, IoT device management system 104 performs three operations:

HTTP request to the main page (GET/), as represented by step 1606. If login credentials are known for said IP address, they are used for HTTP basic authorization. If the HTTP request is successful, then the HTTP main page is obtained.

Telnet connection, as represented by step 1604. If login credentials are known for said IP address, as determined by decision step 1610, then an SSH connection and login is also attempted, as represented by step 1612. If either the telnet or SSH connection is successful, then the command line (telnet/SSH) banner is obtained, as represented by step 1614.

SNMP sysObjectID request, as represented by step 1608. If the community string is known for said IP, then it is used, otherwise the default "public" community string is used. If the SNMP sysObjectID executes successfully, then the sysObject ID reply is obtained.

Once the identification information (i.e., the HTTP main page, the command line (telnet/SSH) banner and/or the sysObjectID reply) has been obtained, it is then checked against identification information stored by each registered abstraction module in order to determine which IoT device type it is and how to communicate with it, as represented by step 1616.

The check may be performed using one of the following two methods (which are provided by way of example only and are not intended to be limiting):

Basic check—checking whether the identification data contains a string that matches an identification string stored in the abstraction module. In an embodiment, abstraction modules are checked until one if found with a matching identification string, after which the search ends. In further accordance with such an embodiment, if no abstraction module matches the identification data, then the IoT device is reported as unsupported.

Performing a fuzzy hash on the identification information and comparing it with the fuzzy hash stored in each abstraction module. The abstraction module which has the best match is then selected. In order to avoid misidentifications, a maximum difference threshold can be set by the user, in which case if no abstraction module has a match better than the threshold, the IoT device is reported as unsupported.

In an embodiment, IoT device management system 104 queries the IoT device in each protocol only once, and the same response is checked against all abstraction modules. IoT device management system 104 does not query the IoT device for each abstraction module that has been registered therewith. IoT device management system 104 reports the name of the matching abstraction module, which can be used to identify the IoT device even if further queries fail. IoT device management system 104 then proceeds to query the device using the protocol specified by the abstraction module (e.g., HTTP, command line or SNMP).

Figure 17:
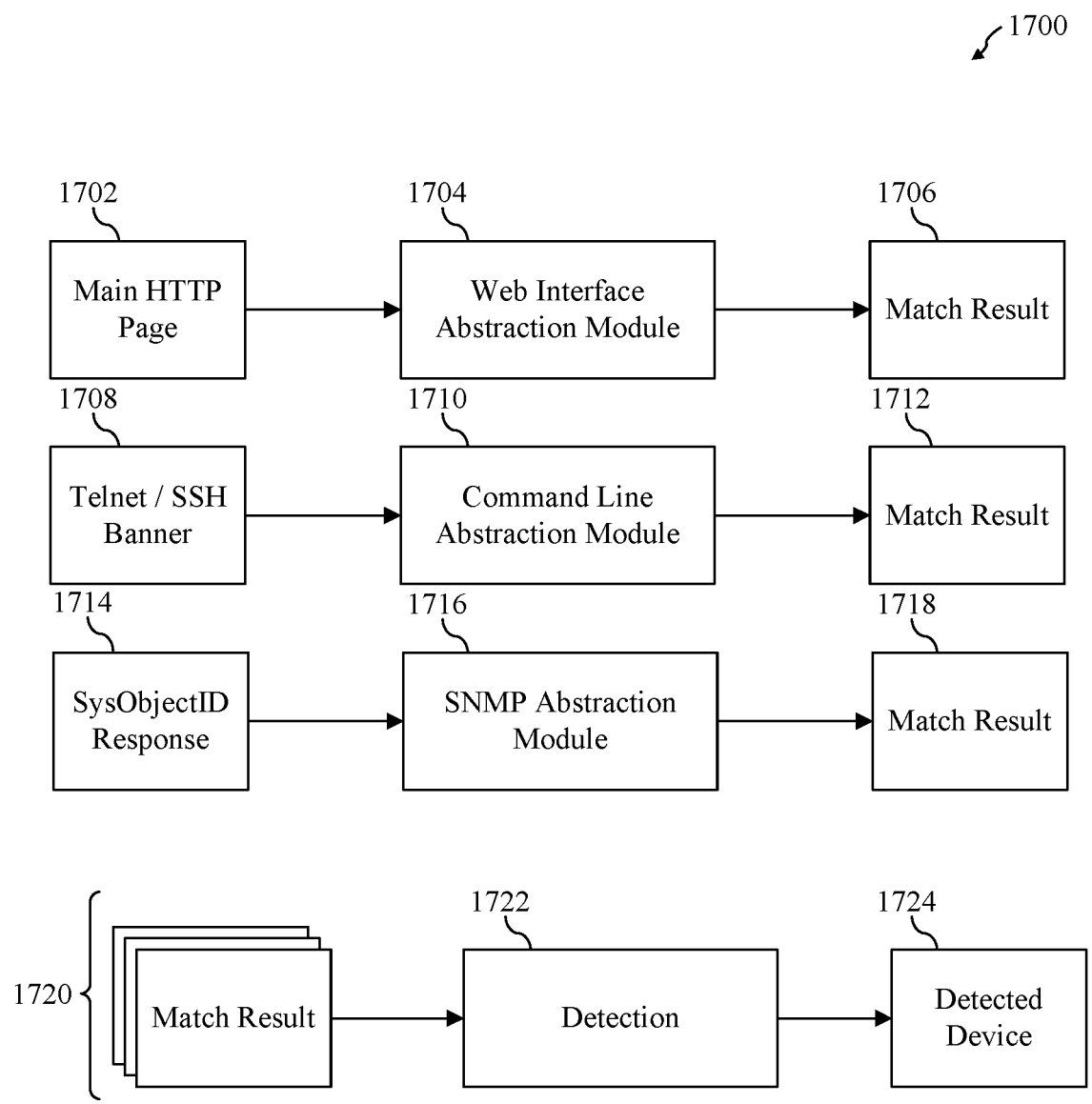
FIG. 17 illustrates a process of iteration of abstraction modules that may be performed by an IoT device management system in accordance with an embodiment.

FIG. 17 illustrates a process of iteration of abstraction modules that may be performed by IoT device management system 104. As shown in FIG. 17, a main HTTP page 1702 obtained from an IoT device may be compared to a main HTTP page stored by a web interface abstraction module 1704 to obtain a match result 1706. Likewise, a telnet/SSH banner obtained from an IoT device may be compared to a telnet/SSH banner stored by a command line abstraction module 1710 to obtain a match result 1712. Further, a SysObjectID response obtained from an IoT device may be compared to a SysObjectId response stored by an SNMP abstraction module to obtain a match result 1718. Based on the collective match results 1720, a detection process 1722 may determine an IoT device type 1724 for a given IoT device.

2. Device Query—Web Interface

Web interfaces are complex and may contain JavaScript scripts, which must be executed to properly communicate with the IoT device. Consequently, simple HTTP queries and parsing static responses will fail in many cases. Two approaches that can be used to overcome this issue are described immediately below.

The first approach involves performing HTTP queries directly. For each query, the response page is passed through an HTML parser and the HTML DOM tree is built. The page is then run through a JavaScript engine with the DOM tree provided as the document object. If the page contains scripts loaded from external sources, then these are also loaded using separate HTTP queries and the response is passed through the same JavaScript engine.

The second approach uses a web-testing framework which can perform browser automation (such as the one used by the module development utility) to launch a headless browser and point it to the IoT device's IP address. The framework can be used to query DOM objects and to retrieve the page HTML code after having potentially been modified by any scripts.

If the IoT device requires login (as specified by the abstraction module), IoT device management system 104 proceeds to log in to the device. The user can configure custom login credentials per-device or in bulk. In addition to custom and default (per-model) credentials, IoT device management system 104 supports enterprise default credentials, configurable by the user. If custom login credentials are available, then these are used to log in to the IoT device. If no custom login credentials are available but the IoT device is known to have default credentials then IoT device management system 104 attempts to use them (note that if login succeeds with default credentials, this triggers an exposure notification, see "Exposures" section later).

If the IoT device uses HTTP level authentication, then the login credentials are sent using basic HTTP authorization on each page request. If the IoT device uses a login form then the abstraction module specifies the location of the username field, password field and login button. IoT device management system 104 fills the details and submits the form to log in. IoT device management system 104 then accepts any cookies set by the IoT device in order to remain logged in as other pages are loaded.

The login process may fail under the following conditions, in which case the query process stops, and an error is reported to the user: (1) the IoT device has custom credentials, but they are incorrect (login failed with the custom credentials); (2) the IoT device has no custom credentials, and the model does not have known default credentials; and (3) the IoT device has no custom credentials and the attempt to log in with the model's default credentials failed.

To verify that login has been successful, IoT device management system 104 searches the response page for a DOM object (or text) specified by the abstraction module as an indication for successful login. This may be, for example, the logout button. If the specified element or text does not appear in the page, then the login is presumed to have failed and an error is reported.

Finally, IoT device management system automatically queries the IoT device for information and configuration according to the specifications of the abstraction module. Each piece of data being queried is composed of the following components:

Path of the page where the information is available—IoT device management system 104 prepends the IP address of the device to the path to build a URL and navigates to it. The abstraction module may specify a delay after navigating in order to allow the page to fully load and all scripts to run.

Optional—Sequence of buttons/elements to click. If present, IoT device management system 104 will click the specified elements in the order specified. A delay between clicks may be specified in the abstraction module to allow script to process each click.

The location of the element containing the desired value in the HTML DOM (see "Data Position Detection" section of the abstraction module development utility), which can be either the content of an element or an attribute of an element (e.g., the "value" attribute of an input box), specified by the abstraction module. IoT device management system 104 extracts and reports the text of the element.

If the abstraction module data for the detail to be queried contains regular expression based forward error correction, then the extracted value is checked against it. If the check fails, the system attempts to find the correct value by matching other DOM elements' text to the regular expression and reporting the one that matches. The UI of IoT device management system 104 allows the user to confirm whether the extracted data is correct. If the user confirms, the new location of the data is saved back into the abstraction module. In the case of two models from the same vendor with slightly different administration interfaces, this case leads to the abstraction module being automatically split into two abstraction modules, one for each model.

If the abstraction module data for the detail to be queried contains title based forward error correction, then IoT device management system 104 queries the corresponding title from the page and compares it with the value saved in the abstraction module. In case of a mismatch, the system scans the page for the given title and reports it if found. As in the case of regular expressions, the user has the ability to confirm the change, in which case it is saved back into the abstraction module or the abstraction module may be split by model.

Both the extracted values and the HTML page source are cached for a configurable time in order to avoid reloading pages if the same value (or a different value on the same page) is requested again.

3. Device Query—Command Line

As the device identification process has already opened a telnet/SSH connection to the IoT device, it is reused to avoid the need to reconnect.

In the case of telnet, if the IoT device requires login (according to the abstraction module) then it sends the login username and passwords, after which it waits a short time for a response and once it receives the response, scans it for text specified by the abstraction module indicating successful login. If the text does not appear or the connection is closed, then the login is presumed to have failed and an error is reported.

As in the case of web interface, this can happen if custom credentials are available but are incorrect, if no custom credentials are available and the IoT device model does not have default credentials or if there are no custom credentials and the attempt to log in with default credentials has failed. As in the case of web interface, if the attempt to log in with default credentials succeeds then an exposure notification is recorded.

It is noted that the login process does not apply to SSH connections as SSH connections must have already been authenticated during the IoT device identification process. Therefore, an already-successful login can be assumed. However, the abstraction module may still specify the default credentials for the sole purpose of checking whether they have been changed.

IoT device management system 104 then proceeds to query device information and configuration as specified by the abstraction module. Each piece of data being queried is composed of the following components:

- Optional—Interface/Menu—Specified if the IoT device uses an interface/menu system. If specified, IoT device management system 104 will navigate through the interface/menu tree (as specified in the abstraction module) to that point.
- Command—The command to send to the IoT device whose response includes the desired data. The system sends this command as is to the device.
- Data position—Where in the output buffer the needed data is located, which can be specified relative to other text, as an absolute position or as a regular expression. IoT device management system 104 extracts and returns the data.
- If the abstraction module data for the detail to be queried contains regular expression based forward error correction, then the extracted value is checked against it. If the check fails, IoT device management system 104 attempts to find the correct value by matching the entire output text to the regular expression and reporting the part that matches. The UI of IoT device management system 104 allows the user to confirm whether the extracted data is correct. If the user confirms, the new location of the data is saved back into the abstraction module. In the case of two models from the same vendor with slightly different administration interfaces, this case leads to the abstraction module being automatically split into two abstraction modules, one for each model.
- If the abstraction module data for the detail to be queried contains title based forward error correction, then IoT device management system 104 queries the corresponding title from the page and compares it with the value saved in the abstraction module. In case of a mismatch, IoT device management system 104 scans the output for the given title and reports it if found. As in the case of regular expressions, the user has the ability to confirm the change, in which case it is saved back into the abstraction module or the abstraction module may be split by model.

As in the case of web interface, the extracted value, as well as the entire output data are cached in order to avoid having to issue the same command more than once.

4. Device Query—SNMP

As SNMP is stateless by nature, the device query procedure is more straightforward. IoT device management system 104 queries all OIDs specified by the abstraction module and reports them as basic information or configuration (as specified by the abstraction module). For each OID the abstraction module specifies whether to query it as a single value or as a bulk. Data position may also be specified, which can be either relative to other text, absolute position, or regular expression, in which case IoT device management system 104 extracts it and reports the extracted part.

Due to the statelessness of SNMP, there is no login process. The community string is sent with every request. As the SNMP device identification process requires the correct community string to succeed, the device query routine can assume that the community string is correct. Therefore, a lack of response or an unexpected response is considered an error.

The response (as well as extracted parts) is cached to avoid the need to query the same OID more than once.

B. Operations

IoT device management system 104 has the ability to perform active operations on supported IoT devices. Active operations can be initiated as responses to alerts and exposures or manually by the user (see "Alerts", "Exposures" and "Asset List").

1. Operations—Web Interface

In the case of web interfaces, the configuration is usually presented as a web form, which can be used to modify it as well. IoT device management system 104 uses the existing page and DOM location information which is used to point to each configuration option (the same information used to query the data) and changes the value of the requested option by modifying the associated DOM element location with the new value. Each abstraction module contains the location of the form submission button in each page, which is used by IoT device management system 104. After the configuration is changed, the new configuration is automatically saved into the configuration baseline of IoT device management system 104 in order to avoid triggering a configuration change alert (see "Alerts" section).

Notable exceptions are discussed below.

Password change—These usually use dedicated configuration pages. Each abstraction module contains the path of the password change page, as well as an optional sequence of clicks (as in the device query routine). Some IoT devices which support multiple users have a different password change link for each user, therefore the click sequence may include a wildcard, causing the system to enumerate the location of such links and associate them with the different users of the user list until the desired username is found. The abstraction module contains the DOM locations of the username (if needed), old password box, new password box, verify password box and form submission button. It then fills the details and submits the form. If the password change is successful, the new password is saved into the custom credentials store so the system can use it the next time the IoT device is queried.

Firmware upgrade—Each abstraction module which supports this operation contains the path of the firmware upgrade page, an optional sequence of clicks, the location of the file selection button and the form submission button. The system fills and submits the form, then waits for the firmware upgrade process to complete (the wait period is specified by the abstraction module). Some IoT devices display a system restart prompt when the firmware upgrade is complete, in which case the restart button location is also included in the abstraction module. The system clicks the restart button once it appears (both a restart button and a wait period are specified in the module then the wait period is the maximum time to wait for the restart button to appear before the operation is considered to have failed).

2. Operations—Command Line

Details for operations performed using a command line (telnet/SSH) interface are included in abstraction modules in a format similar to the device query data—namely, for each option that can be modified, the abstraction module contains the necessary interface/menu (if appropriate) and the command to issue. The command probably includes arguments, such as {new_value} for configuration change commands and {new_password} for password change commands (see more in the command line subsection of the module development section). IoT device management system 104 replaces these argument indicators with the appropriate values when issuing the command.

Each configuration change command is associated in the abstraction module with the appropriate configuration query command. After a configuration value is changed, IoT device management system 104 automatically runs the query command as well and saves the new value into the baseline, which is used to avoid a configuration change alert (see "Alerts" section).

In the case of password changes, if the change is successful, IoT device management system 104 saves the new password into the custom credentials database so it can be used the next time the device is queried.

In the case of firmware upgrade: most command line interfaces use a TFTP server to provide the new firmware binary. IoT device management system 104 can either provide the location of the file on a TFTP server configurable by the user or use an internal TFTP server.

3. Operations—SNMP

Details for operations performed using SNMP are included in the abstraction modules in a format similar to the device query details—namely, each configuration option which can be modified is associated in the abstraction module with an OID or a sequence of OIDs, as well as the arguments that each OID accepts. If the OID used for setting a configuration option is different from the OID used to query it then this association is specified in the abstraction module as well.

After a configuration value is changed, IoT device management system 104 automatically runs the query command as well and saves the new value into the baseline, which is used to avoid a configuration change alert (see "Alerts" section).

In the case of password/community string changes, if the change is successful, IoT device management system 104 saves the new password/community string into the custom credentials database so it can be used the next time the device is queried.

In the case of firmware upgrade: as SNMP does not support file uploads, IoT devices which support firmware upgrade using SNMP use an external server from which the new firmware is fetched. Usually the TFTP protocol is used. IoT device management system 104 can either provide the location of the file on a TFTP server configurable by the user or use an internal TFTP server.

C. Alerts

As IoT device management system queries and processes data, it generates alerts. Alerts provide the user with immediate notifications regarding changes in IoT devices, which may require immediate attention. Alerts from all IoT devices may be aggregated into a single UI, where they can be reviewed and resolved by the user in bulk.

Notable alerts are discussed below:

Configuration changes—IoT device management system 104 keeps track of all configuration values queried. When a previously queried device is queried again, the configuration values are compared with those known from the previous query. Any differences are reported in a configuration change alert. The alert UI contains an option to revert the changes (refer to "Operations" section for a technical description of how this is done). Alternatively, the user may also acknowledge the change, in which case the new configuration becomes the baseline against which new configuration queries are compared.

Operational status—IoT device management system 104 queries devices for their operational status. If the status does not conform to normal operation, then this alert is generated. This alert is not security related (for example, it may be logged if a printer is out of paper). IoT device management system 104 generates this alert if the status string contains indicative words (e.g., "error", "warning") and the abstraction module may customize them as well.

Firmware upgrade—This is reported whether the firmware version reported by the IoT device is different than the previously queried value. This usually indicates a firmware upgrade and is not considered a security issue; however, it is still brought to the user's attention.

Abnormal configuration—If the user has multiple IoT devices of the same model, IoT device management system 104 compares the configuration between them. If a one or a handful of IoT devices have a certain configuration value different than the rest, an alert is generated.

| Name | Description |
| --- | --- |
| New Device | A new IoT device has been discovered. |
| Configuration Changed | A configuration value has been changed on the IoT device since the last scan. |
| Abnormal Configuration | A configuration value of a certain IoT device is different than most of the IoT devices of the same model in the enterprise network. |
| Firmware Changed | The IoT device firmware version has been changed. |
| Device no longer Supported | An IoT device which was previously supported is no longer supported. |
| Device offline | A previously known IoT device is not responding. |
| Device not Provisioned | An IoT device of a known model is not provisioned by the system (e.g., no valid credentials). |
| Operational Status Error | The IoT device reports an issue with its operational status (varies by IoT device type). |

D. Exposures

Exposures are similar to alerts from a technical perspective (i.e., they are generated in the same fashion when querying data) but are logically different from the user point of view, therefore they may be displayed in a different UI. Exposures refer to weaknesses in the security of the IoT device, which can potentially be used by malicious actors to gain unauthorized access to the IoT device. This proactive approach allows the user to spot these weaknesses before such incidents occur.

Some notable exposures are discussed below.

Default passwords—If a certain IoT device abstraction module has a fixed password set up in the initial ("factory") configuration then this is a major security risk, as the default credentials are usually documented in the user manual and can be easily used to gain unauthorized access to the administration interface of the IoT device. IoT management system 104 detects this by attempting to log in to the IoT device using the default credentials (which are embedded in the abstraction module). For the purpose of checking for this exposure, IoT device management system 104 attempts to log in to the IoT device using the default credentials even if custom credentials are available. The UI has an option to automatically change the password to either a password entered by the user or a random password chosen by the system.

Administration interface which cannot be protected—Some IoT devices, mainly older IoT devices and IoT devices that are mainly intended for home use do not have any way of protecting the administration interface (whether using a password or otherwise). IoT device management system 104 identifies these IoT devices by the lack of any authentication mechanism in the abstraction module. The mere detection of such IoT devices on the network triggers this exposure. This exposure does not have an automatic remediation as it requires protection at the network level (e.g., firewall) or in extreme cases even the replacement of the device.

Vulnerable configuration—As the abstraction module specifies different configuration options to query (and the method of querying them—see "Querying Devices" section), it may also specify weak values for each one. These can be specified positively (i.e., if the option is set to one of known weak values) or negatively (i.e., if the option is set to anything other than a list of known strong values). This exposure is reported when such values are encountered. For example: If the abstraction module uses a web interface to access the IoT device but other administration interfaces (e.g., telnet) are enabled in the configuration, then this is considered an exposure. Note that it is not mandatory for all configuration options to have associated weak values. The exposure UI has an option to change the configuration to one of the known strong values.

If multiple devices share the same exposures, then these are grouped together, and the user can resolve them in bulk.

| Name | Description |
| --- | --- |
| Plaintext Authentication | An IoT device uses an authentication method in which the password is passed unprotected (i.e., cleartext) over the network. |
| Default Credentials | The authentication credentials have not been changed from the model default. |
| SNMP public read access | The SNMP read community string has not been changed from the protocol default (i.e., "public"). |
| SNMP public write access | The SNMP write community string has not been changed from the protocol default (i.e., "private"). |
| Weak Configuration | A configuration option is set to a value that is known to potentially be insecure. |
| Call Home | An IoT device is configured to connect to cloud services or send telemetry to its manufacturer or $3^{rd}$ party. |
| Authentication not Supported | An IoT device which does not support any authentication has been detected on the network. |

E. Common Vulnerabilities and Exposures (CVE)

CVE stands for "Common Vulnerabilities and Exposures." This is the most comprehensive list of known vulnerabilities in both computer software and device firmware. Almost all reported security vulnerabilities (both major and minor) have an associated CVE number.

CVEs for IoT devices generally include the affected firmware versions and the first firmware version in which the vulnerability is fixed. IoT device management system 104 determines whether an IoT device is vulnerable to a CVE by checking the firmware version reported by the IoT device against the list of vulnerable firmware versions in the central CVE database. This method allows IoT device management system 104 to determine whether an IoT device is vulnerable to a certain CVE without actively attempting to exploit it.

If a new firmware version is available, the system allows the user to upload it and upgrade all affected devices at once.

F. Asset List

IoT device management system 104 presents a list of all IoT devices detected on the network, along with basic details, such as the device IP and MAC address, the detected device type (e.g., printer, camera) and the exact model of the device.

IoT device management system 104 also reports whether the IoT device is supported (i.e., an abstraction module is available to communicate with the device) and the connection status—whether the IoT device is on-line, and the system has valid login credentials.

The user has the ability to select one or more IoT devices and perform active operations in bulk (see the "Operations" section). This allows the user to initiate bulk operations manually (i.e., not as a response to a given alert/exposure).

1. Asset Details

By clicking on an IoT device in the asset list, the user can view detailed information about a specific device, including all information queried from the device on the last scan. In the case of configuration, the user can view both the current configuration and the baseline against which it is compared, and the option to acknowledge the new configuration or revert it. This is another way of handling configuration change alerts (see "Alerts" section).

The user has the ability to perform active operation on the device from this UI as well.

VII. Additional Example Embodiments

Figure 18:
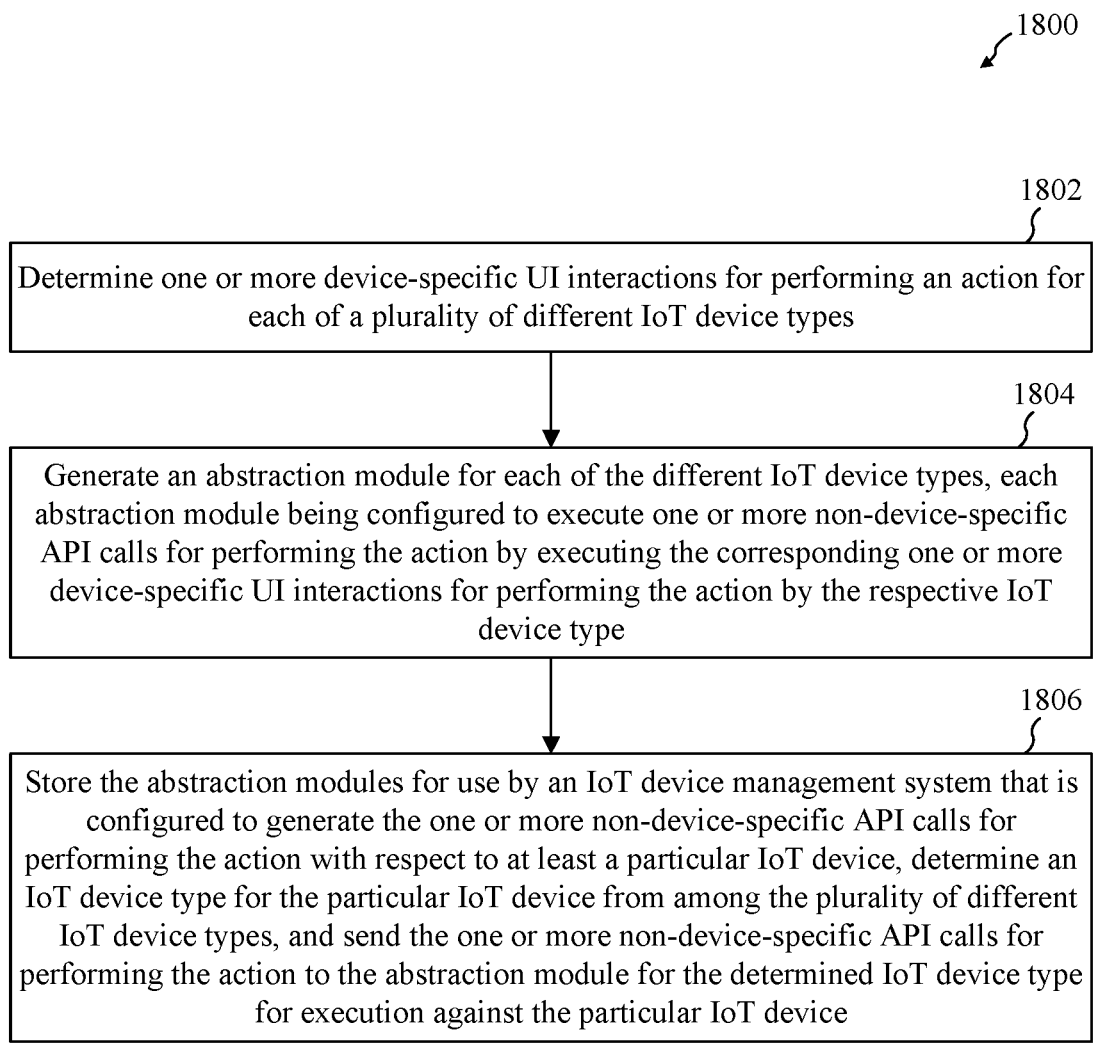
FIG. 18 depicts a flowchart of a method for developing device-specific abstraction modules for use in providing centralized monitoring and control of IoT devices.

FIG. 18 depicts a flowchart 1800 of a method for developing device-specific abstraction modules for use in providing centralized monitoring and control of IoT devices in accordance with an embodiment. The method of flowchart 1800 may be performed by and will be described in reference to abstraction module development utility 102 of FIG. 1, although the method is not limited to that implementation. Persons skilled in the relevant art(s) will appreciate that the method of flowchart 1800 may be performed by other components or systems entirely.

As shown in FIG. 18, the method of flowchart 1800 begins at step 1802, in which abstraction module development utility 102 determines one or more device-specific UI interactions for performing an action for each of a plurality of different IoT device types. As discussed elsewhere herein, the plurality of different IoT device types may have corresponding different administration interface types, including two or more of: web-based, command-line-based, or SNMP-based.

As also discussed elsewhere herein, the action to be performed may comprise, for example, obtaining operational status information from an IoT device, obtaining configuration information from an IoT device, changing a configuration of an IoT device, performing a firmware upgrade on an IoT device, performing a password change on an IoT device, or detecting a security weakness of an IoT device.

As further discussed elsewhere herein, abstraction module development utility 102 may determine the one or more device-specific UI interactions for performing the action for each of the plurality of different IoT device types in one or more of: an interactive manner or a non-interactive manner.

As still further discussed elsewhere herein, abstraction module development utility 102 may determine the one or more device-specific UI interactions for performing the action for each of the plurality of different IoT device types by performing one or more of the following with respect to each of the plurality of different IoT device types: login training, interface/menu tree training, data query training, or operation training. The operation training may comprise one or more of: configuration change operation training, change password operation training, or firmware upgrade operation training.

At step 1804, abstraction module development utility 102 generates an abstraction module for each of the different IoT device types, each abstraction module being configured to execute one or more non-device-specific API calls for performing the action by executing the corresponding one or more device-specific UI interactions for performing the action by the respective IoT device type.

At step 1806, abstraction module development utility 102 stores the abstraction modules for use by an IoT device management system (e.g., IoT device management system 104) that is configured to generate the one or more non-device-specific API calls for performing the action with respect to at least a particular IoT device, determine an IoT device type for the particular IoT device from among the plurality of different IoT device types, and send the one or more non-device-specific API calls for performing the action to the abstraction module for the determined IoT device type for execution against the particular IoT device.

Figure 19:
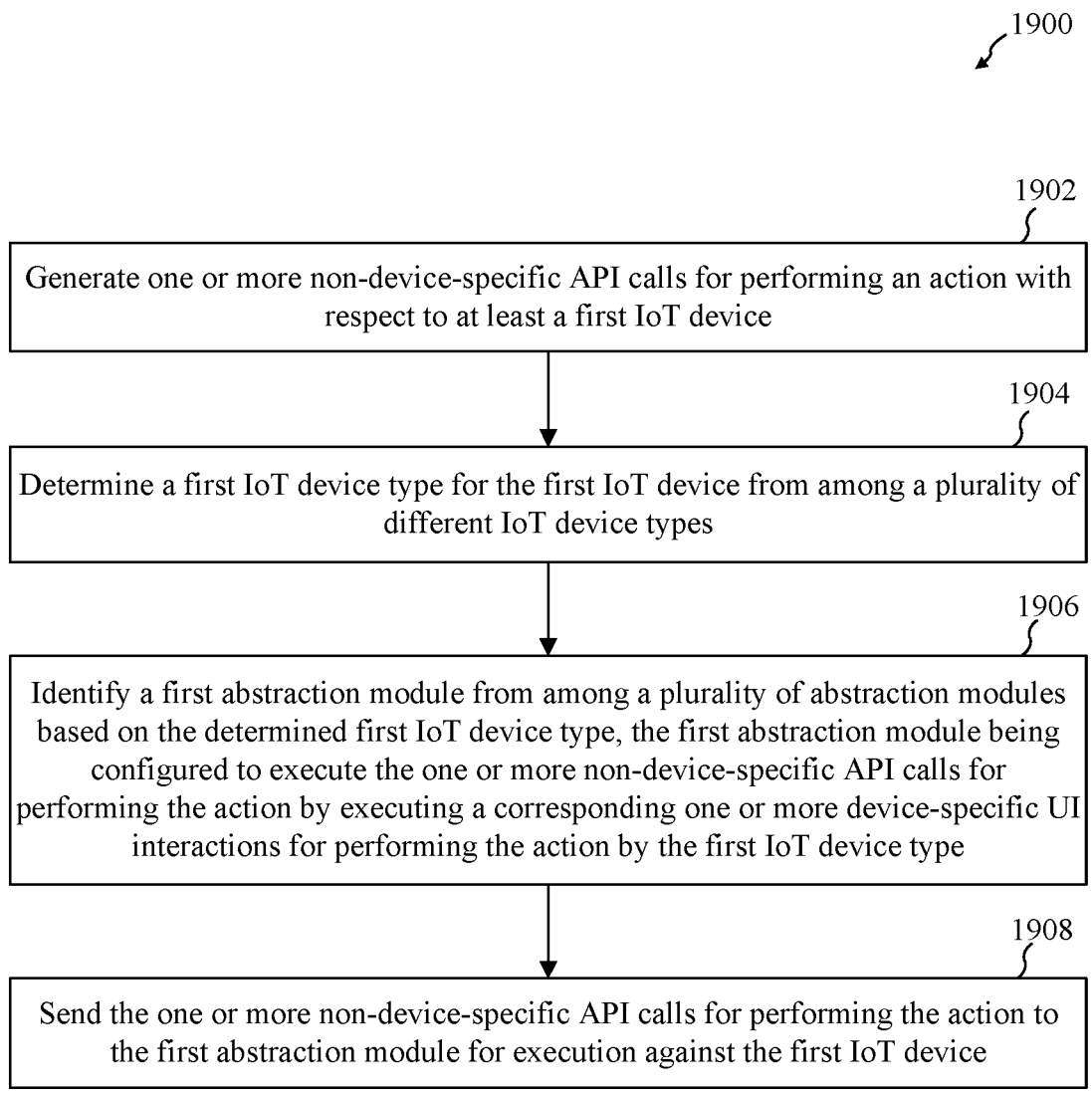
FIG. 19 depicts a flowchart of a method for monitoring and controlling IoT devices in a centralized manner.

FIG. 19 depicts a flowchart 1900 of a method for monitoring and controlling IoT devices in a centralized manner in accordance with an embodiment. The method of flowchart 1900 may be performed by and will be described in reference to IoT device management system 104 of FIG. 1, although the method is not limited to that implementation. Persons skilled in the relevant art(s) will appreciate that the method of flowchart 1900 may be performed by other components or systems entirely.

As shown in FIG. 19, the method of flowchart 1900 begin at step 1902, in which IoT device management system 104 generates one or more non-device-specific API calls for performing an action with respect to at least a first IoT device.

As discussed elsewhere herein, the action to be performed may comprise, for example, obtaining operational status information from an IoT device, obtaining configuration information from an IoT device, changing a configuration of an IoT device, performing a firmware upgrade on an IoT device, performing a password change on an IoT device, or detecting a security weakness of an IoT device.

At step 1904, IoT device management system 104 determines a first IoT device type for the first IoT device from among a plurality of different IoT device types.

As discussed elsewhere herein, IoT device management system 104 may determine the first IoT device type for the first IoT device from among the plurality of different IoT device types by interacting with the first IoT device to obtain identifying information for the first IoT device and comparing the obtained identifying information to stored identifying information for each of the plurality of different IoT device types. The obtained identifying information may comprise, for example and without limitation: a page of an administration interface of the first IoT device, or a portion thereof; a hash of the page of the administration interface of the first IoT device, or the portion thereof; a banner transmitted from the first IoT device upon connection thereto; a hash of the banner transmitted from the first IoT device upon connection thereto; a unique value returned by the first IoT device in response to a sysObjectID query; or a hash of the unique value returned by the first IoT device in response to the sysObjectID query.

At step 1906, IoT device management system 104 identifies a first abstraction module from among a plurality of abstraction modules based on the determined first IoT device type, wherein the first abstraction module is configured to execute the one or more non-device-specific API calls for performing the action by executing a corresponding one or more device-specific UI interactions for performing the action by the first IoT device type.

At step 1908, IoT device management system 104 sends the one or more non-device-specific API calls for performing the action to the first abstraction module for execution against the first IoT device.

In further embodiments, step 1902 further comprises generating the one or more non-device-specific API calls for performing the action with respect to at least the first IoT device and a second IoT device. In further accordance with such an embodiment, the method of flowchart 1900 may further comprise the following steps: determining a second IoT device type for the second IoT device from among the plurality of different IoT device types; identifying a second abstraction module from among a plurality of abstraction modules based on the determined second IoT device type, the second abstraction module being configured to execute the one or more non-device-specific API calls for performing the action by executing a corresponding one or more device-specific UI interactions for performing the action by the second IoT device type; and sending the one or more non-device-specific API calls for performing the action to the second abstraction module for execution against the second IoT device.

In further accordance with such an embodiment, both of the following may be performed in response to a single user request received by IoT device management utility 104: the sending the one or more non-device-specific API calls for performing the action to the first abstraction module for execution against the first IoT device; and the sending the one or more non-device-specific API calls for performing the action to the second abstraction module for execution against the second IoT device.

In still further accordance with such an embodiment, the method of flowchart 1900 may further comprise aggregating the following into a single user interface of the IoT device management utility for presentation to a user: results associated with the execution of the one or more non-device-specific API calls for performing the action against the first IoT device; and results associated with the execution of the one or more non-device-specific API calls for performing the action against the second IoT device.

VIII. Example Computer System Implementation

Figure 20:
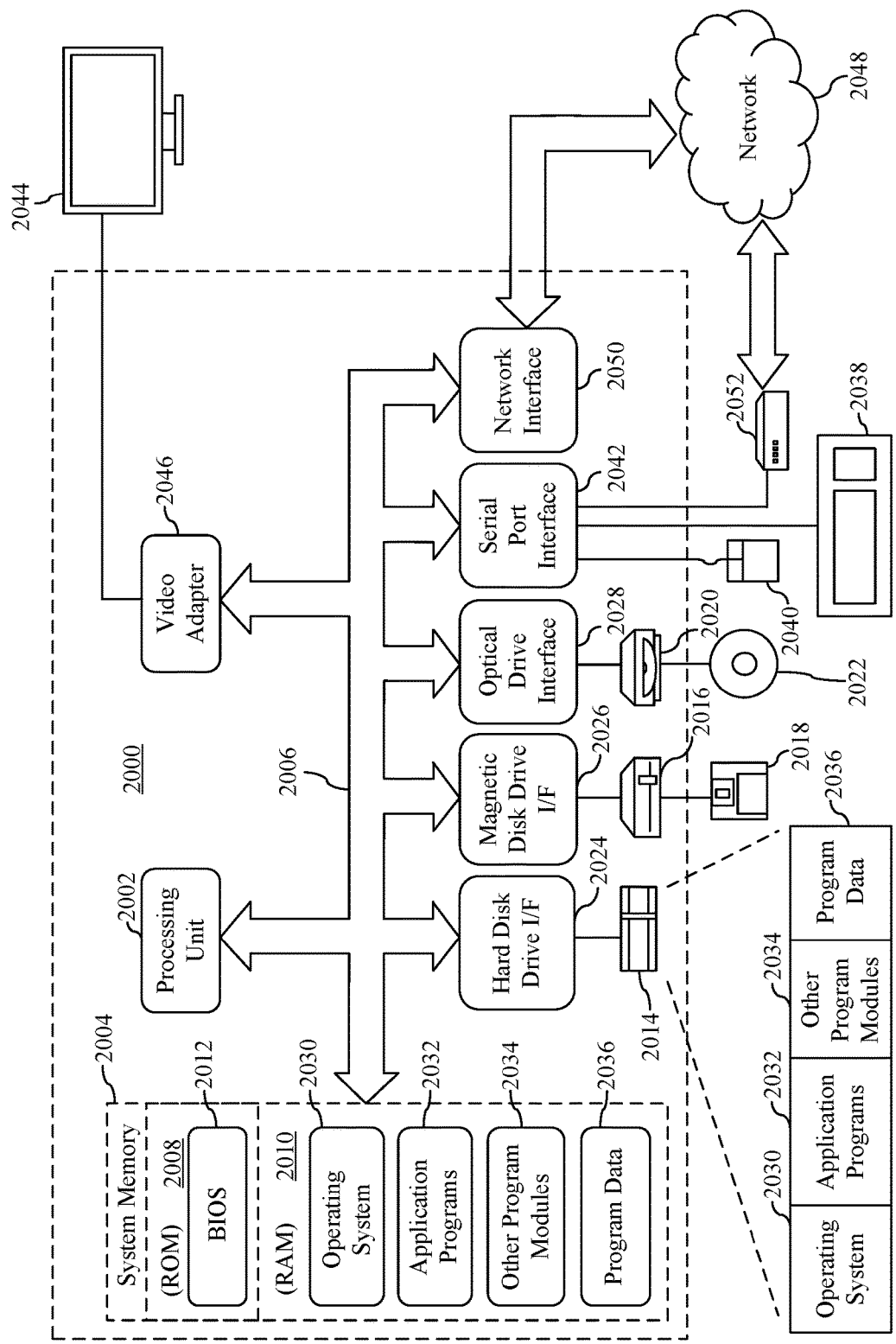
FIG. 20 depicts an example processor-based computer system that may be used to implement various embodiments described herein.

FIG. 20 depicts an example processor-based computer system 2000 that may be used to implement various embodiments described herein, including abstraction module development utility 102 or IoT device management system 104 of FIG. 1, as described above. System 2000 may also be used to implement, in whole or in part, any of the processes described above in reference to FIGS. 2-7 and 9-19. The description of system 2000 provided herein is provided for purposes of illustration and is not intended to be limiting. Embodiments may be implemented in further types of computer systems, as would be known to persons skilled in the relevant art(s).

As shown in FIG. 20, system 2000 includes a processing unit 2002, a system memory 2004, and a bus 2006 that couples various system components including system memory 2004 to processing unit 2002. Processing unit 2002 may comprise one or more microprocessors or microprocessor cores. Bus 2006 represents one or more of any of several types of bus structures, including a memory bus or memory controller, a peripheral bus, an accelerated graphics port, and a processor or local bus using any of a variety of bus architectures. System memory 2004 includes read only memory (ROM) 2008 and random-access memory (RAM) 2010. A basic input/output system 2012 (BIOS) is stored in ROM 2008.

System 2000 also has one or more of the following drives: a hard disk drive 2014 for reading from and writing to a hard disk, a magnetic disk drive 2016 for reading from or writing to a removable magnetic disk 2018, and an optical disk drive 2020 for reading from or writing to a removable optical disk 2022 such as a CD ROM, DVD ROM, BLU-RAY™ disk or other optical media. Hard disk drive 2014, magnetic disk drive 2016, and optical disk drive 2020 are connected to bus 2006 by a hard disk drive interface 2024, a magnetic disk drive interface 2026, and an optical drive interface 2028, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules or components may be stored on the hard disk, magnetic disk, optical disk, ROM, or RAM. These program modules include an operating system 2030, one or more application programs 2032, other program modules 2034, and program data 2036. In accordance with various embodiments, the program modules may include computer program logic that is executable by processing unit 2002 to perform any or all the functions and features of abstraction module development utility 102 or IoT device management system 104 of FIG. 1, as described above. The program modules may also include computer program logic that, when executed by processing unit 2002, implement, in whole or in part, any of the processes described above in reference to FIGS. 2-7 and 9-19.

A user may enter commands and information into system 2000 through input devices such as a keyboard 2038 and a pointing device 2040. Other input devices (not shown) may include a microphone, joystick, game controller, scanner, or the like. In one embodiment, a touch screen is provided in conjunction with a display 2044 to allow a user to provide user input via the application of a touch (as by a finger or stylus for example) to one or more points on the touch screen. These and other input devices are often connected to processing unit 2002 through a serial port interface 2042 that is coupled to bus 2006, but may be connected by other interfaces, such as a parallel port, game port, or a Universal Serial Bus (USB). Such interfaces may be wired or wireless interfaces.

A display 2044 is also connected to bus 2006 via an interface, such as a video adapter 2046. In addition to display 2044, system 2000 may include other peripheral output devices (not shown) such as speakers and printers.

System 2000 is connected to a network 2048 (e.g., a local area network or wide area network such as the Internet) through a network interface or adapter 2050, a modem 2052, or other suitable means for establishing communications over the network. Modem 2052, which may be internal or external, is connected to bus 2006 via serial port interface 2042. As used herein, the terms "computer program medium," "computer-readable medium," and "computer-readable storage medium" are used to generally refer to memory devices or storage structures such as the hard disk associated with hard disk drive 2014, removable magnetic disk 2018, removable optical disk 2022, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 2032 and other program modules 2034) may be stored on the hard disk, magnetic disk, optical disk, ROM, or RAM. Such computer programs may also be received via network interface 2050, serial port interface 2042, or any other interface type. Such computer programs, when executed or loaded by an application, enable system 2000 to implement features of embodiments of the present methods and systems described herein. Accordingly, such computer programs represent controllers of the system 2000.

Embodiments are also directed to computer program products comprising software stored on any computer useable medium. Such software, when executed in one or more data processing devices, causes a data processing device(s) to operate as described herein. Embodiments of the present methods and systems employ any computer-useable or computer-readable medium, known now or in the future. Examples of computer-readable mediums include but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

IX. Conclusion

While various embodiments of the present methods and systems have been described above, they have been presented by way of example only, and not limitation. It will be apparent to persons skilled in the relevant art that various changes in form and detail can be made therein without departing from the spirit and scope of the methods and systems. Thus, the breadth and scope of the present methods and systems should not be limited by any of the above-described exemplary embodiments but should be defined only in accordance with the following claims and their equivalents.

What is claimed is:

1. A system for centralized monitoring and control of Internet of Things (IoT) devices, comprising:
    one or more first computers configured to execute an abstraction module development utility that is configured to:
        determine one or more device-specific user interface (UI) interactions for performing an action for each of a plurality of different IoT device types; and
        generate an abstraction module for each of the different IoT device types, each abstraction module being configured to execute one or more non-device-specific application programming interface (API) calls for performing the action by executing the corresponding one or more device-specific UI interactions for performing the action by the respective IoT device type; and
    one or more second computers configured to execute an IoT device management system that is configured to:
        generate the one or more non-device-specific API calls for performing the action with respect to at least a particular IoT device;
        determine an IoT device type for the particular IoT device from among the plurality of different IoT device types; and
        send the one or more non-device-specific API calls for performing the action to the abstraction module for the determined IoT device type for execution against the particular IoT device.

2. The system of claim 1, wherein the action comprises one of:
    obtaining operational status information from an IoT device;
    obtaining configuration information from an IoT device;
    changing a configuration of an IoT device;
    performing a firmware upgrade on an IoT device;
    performing a password change on an IoT device; or
    detecting a security weakness of an IoT device.

3. The system of claim 1, wherein the abstraction module development utility is configured to determine the one or more device-specific UI interactions for performing the action for each of the plurality of different IoT device types in one or more of:
    an interactive manner; or
    a non-interactive manner.

4. The system of claim 1, wherein the abstraction module development utility is configured to determine the one or more device-specific UI interactions for performing the action for each of the plurality of different IoT device types by performing one or more of the following with respect to each of the plurality of different IoT device types:
    login training;
    interface/menu tree training;
    data query training; or
    operation training.

5. The system of claim 4, where the operation training comprises one or more of:
    configuration change operation training;
    change password operation training; or
    firmware upgrade operation training.

6. The system of claim 1, wherein the plurality of different IoT device types have corresponding different administration interface types, including two or more of:
    web-based;
    command-line-based; or
    SNMP-based.

7. The system of claim 1, wherein the IoT device management system is configured to determine the IoT device type for the particular IoT device from among the plurality of different IoT device types by:
    interacting with the particular IoT device to obtain identification information for the particular IoT device; and
    comparing the obtained identification information to stored identification information for each of the plurality of different IoT device types.

8. The system of claim 7, wherein the obtained identification information comprises one of:
    a page of an administration interface of the particular IoT device, or a portion thereof;
    a hash of the page of the administration interface of the particular IoT device, or the portion thereof;
    a banner transmitted from the particular IoT device upon connection thereto;
    a hash of the banner transmitted from the particular IoT device upon connection thereto;
    a unique value returned by the particular IoT device in response to a sysObjectID query; or
    a hash of the unique value returned by the particular IoT device in response to the sysObjectID query.

9. The system of claim 1, wherein the IoT device management system is further configured to send the one or more non-device-specific API calls for performing the action to a plurality of different abstraction modules for execution against a corresponding plurality of different IoT devices.

10. The system of claim 9, wherein the IoT device management system is configured to send the one or more non-device-specific API calls for performing the action to the plurality of different abstraction modules for execution against the corresponding plurality of different IoT devices responsive to a single user request.

11. The system of claim 9, wherein the IoT device management system is configured to aggregate results associated with the execution of the one or more non-device-specific API calls for performing the action against the corresponding plurality of different IoT devices into a single user interface for presentation to a user.

12. A method performed by an abstraction module development utility executing on one or more computing devices, comprising:
   determining one or more device-specific user interface (UI) interactions for performing an action for each of a plurality of different IoT device types;
   generating an abstraction module for each of the different IoT device types, each abstraction module being configured to execute one or more non-device-specific application programming interface (API) calls for performing the action by executing the corresponding one or more device-specific UI interactions for performing the action by the respective IoT device type; and
   storing the abstraction modules for use by an IoT device management system that is configured to generate the one or more non-device-specific API calls for performing the action with respect to at least a particular IoT device, determine an IoT device type for the particular IoT device from among the plurality of different IoT device types, and send the one or more non-device-specific API calls for performing the action to the abstraction module for the determined IoT device type for execution against the particular IoT device.

13. The method of claim 12, wherein the action comprises one of:
   obtaining operational status information from an IoT device;
   obtaining configuration information from an IoT device;
   changing a configuration of an IoT device;
   performing a firmware upgrade on an IoT device;
   performing a password change on an IoT device; or
   detecting a security weakness of an IoT device.

14. The method of claim 12, wherein the determining the one or more device-specific UI interactions for performing the action for each of the plurality of different IoT device types is performed in one or more of:
   an interactive manner; or
   a non-interactive manner.

15. The method of claim 12, wherein generating the abstraction modules comprises:
   generating at least one of the abstraction modules in a manner that does not require the writing of program code.

16. The method of claim 12, wherein the determining the one or more device-specific UI interactions for performing the action for each of the plurality of different IoT device types comprises performing one or more of the following with respect to each of the plurality of different IoT device types:
   login training;
   interface/menu tree training;
   data query training; or
   operation training.

17. The method of claim 16, where the operation training comprises one or more of:
   configuration change operation training;
   change password operation training; or
   firmware upgrade operation training.

18. The method of claim 12, wherein the plurality of different IoT device types have corresponding different administration interface types, including two or more of:
   web-based;
   command-line-based; or
   SNMP-based.

19. The method of claim 12, wherein the determining the one or more device-specific UI interactions for performing the action for each of the plurality of different IoT device types comprises:
   determining the one or more device-specific UI interactions for performing the action for an IoT device type with a web-based interface using a browser automation framework to perform one or more of data position detection and form filling detection.

20. A method performed by an IoT device management system executing on one or more computers, the method comprising:
   generating one or more non-device-specific application programming interface (API) calls for performing an action with respect to at least a first IoT device;
   determining a first IoT device type for the first IoT device from among a plurality of different IoT device types;
   identifying a first abstraction module from among a plurality of abstraction modules based on the determined first IoT device type, the first abstraction module being configured to execute the one or more non-device-specific API calls for performing the action by executing a corresponding one or more device-specific UI interactions for performing the action by the first IoT device type; and
   sending the one or more non-device-specific API calls for performing the action to the first abstraction module for execution against the first IoT device.

21. The method of claim 20, wherein the determining the first IoT device type for the first IoT device from among the plurality of different IoT device types comprises:
   interacting with the first IoT device to obtain identification information for the first IoT device; and
   comparing the obtained identification information to stored identification information for each of the plurality of different IoT device types.

22. The method of claim 21, wherein the obtained identification information comprises one of:
   a page of an administration interface of the first IoT device, or a portion thereof;
   a hash of the page of the administration interface of the first IoT device, or the portion thereof;
   a banner transmitted from the first IoT device upon connection thereto;
   a hash of the banner transmitted from the first IoT device upon connection thereto;
   a unique value returned by the first IoT device in response to a sysObjectID query; or
   a hash of the unique value returned by the first IoT device in response to the sysObjectID query.

23. The method of claim 20, wherein the first IoT device comprises an IoT device with a web-based interface and wherein the IoT device management system comprises a browser automation framework for interacting with the web-based interface.

24. The method of claim 20, wherein the generating the one or more non-device-specific API calls for performing an action with respect to at least the first IoT device comprises:

generating the one or more non-device-specific API calls for performing the action with respect to at least the first IoT device and a second IoT device; and wherein the method further comprises:

determining a second IoT device type for the second IoT device from among the plurality of different IoT device types;

identifying a second abstraction module from among a plurality of abstraction modules based on the determined second IoT device type, the second abstraction module being configured to execute the one or more non-device-specific API calls for performing the action by executing a corresponding one or more device-specific UI interactions for performing the action by the second IoT device type; and sending the one or more non-device-specific API calls for performing the action to the second abstraction module for execution against the second IoT device.

25. The method of claim 24, wherein both of the following are performed in response to a single user request received by the IoT device management system:

the sending the one or more non-device-specific API calls for performing the action to the first abstraction module for execution against the first IoT device; and the sending the one or more non-device-specific API calls for performing the action to the second abstraction module for execution against the second IoT device.

26. The method of claim 24, further comprising aggregating the following into a single user interface of the IoT device management system for presentation to a user:

results associated with the execution of the one or more non-device-specific API calls for performing the action against the first IoT device; and results associated with the execution of the one or more non-device-specific API calls for performing the action against the second IoT device.

* * * * *